United States Patent
Doi et al.

(10) Patent No.: US 8,327,398 B2
(45) Date of Patent: Dec. 4, 2012

(54) APPARATUS, COMPUTER PROGRAM PRODUCT, AND METHOD FOR DATA DISTRIBUTION

(75) Inventors: Miwako Doi, Minato-ku (JP); Tetsuro Muranaga, Minato-ku (JP); Noriaki Koyama, Minato-ku (JP); Tetsuya Gotou, Minato-ku (JP); Hideki Tsutsui, Minato-ku (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 385 days.

(21) Appl. No.: 11/533,963

(22) Filed: Sep. 21, 2006

(65) Prior Publication Data
US 2007/0180478 A1 Aug. 2, 2007

(30) Foreign Application Priority Data
Jan. 31, 2006 (JP) .................... 2006-022669

(51) Int. Cl.
*H04N 7/025* (2006.01)
(52) U.S. Cl. ........................................ 725/32
(58) Field of Classification Search ............ 725/86–104, 725/32–36
See application file for complete search history.

(56) References Cited

U.S. PATENT DOCUMENTS

| | | | | |
|---|---|---|---|---|
| 5,805,974 A * | 9/1998 | Hite et al. | | 725/69 |
| 6,002,393 A * | 12/1999 | Hite et al. | | 715/719 |
| 6,070,186 A * | 5/2000 | Nishio | | 725/92 |
| 6,442,755 B1 * | 8/2002 | Lemmons et al. | | 725/47 |
| 6,718,551 B1 * | 4/2004 | Swix et al. | | 725/32 |
| 7,017,173 B1 * | 3/2006 | Armstrong et al. | | 725/87 |
| 2001/0007980 A1 | 7/2001 | Ishibashi et al. | | |
| 2003/0027519 A1 * | 2/2003 | Bouvet | | 455/3.01 |
| 2003/0028873 A1 * | 2/2003 | Lemmons | | 725/36 |
| 2004/0233209 A1 * | 11/2004 | Evans et al. | | 345/581 |
| 2005/0125823 A1 * | 6/2005 | McCoy et al. | | 725/34 |

FOREIGN PATENT DOCUMENTS

| | | |
|---|---|---|
| CN | 1306261 A | 8/2001 |
| CN | 1326639 A | 12/2001 |
| JP | 7-107066 | 4/1995 |
| JP | 10-336625 | 12/1998 |
| JP | 2002-24250 | 1/2002 |
| JP | 2002-215075 | 7/2002 |
| JP | 2003-9116 | 1/2003 |
| JP | 2005-278123 | 10/2005 |
| KR | 2004-0093248 | 11/2004 |
| WO | WO 00/22818 | 4/2000 |

* cited by examiner

*Primary Examiner* — Nicholas Corbo
(74) *Attorney, Agent, or Firm* — Oblon, Spivak, McClelland, Maier & Neustadt, L.L.P.

(57) ABSTRACT

A data distribution apparatus includes a data file configured to store video data and advertisement data to be provided to a receiving terminal of a Video on Demand service; a video distributing unit configured to distribute video data in accordance with a distribution request from the receiving terminal; a video presentation confirming unit configured to confirm a presentation state of the video data at the receiving terminal; an advertisement distribution determining unit configured to determine distribution of advertisement data to the receiving terminal when it is confirmed that the video data to be distributed by the video distributing unit is being called; and an advertisement distributing unit configured to distribute the advertisement data.

7 Claims, 24 Drawing Sheets

| RECOMMENDATION RANKING | CONTENT OF ADVERTISEMENT | GENRE |
|---|---|---|
| 1 | OO MOVIE FROM DD/MM/YY... | PROGRAM |
| 2 | XX ADVERTISEMENT... | PR |
| ⋮ | ⋮ | ⋮ |

| RECOMMENDATION RANKING | CONTENT OF ADVERTISEMENT | GENRE |
|---|---|---|
| 1 | OO MOVIE FROM DD/MM/YY... | PROGRAM |
| 2 | XX ADVERTISEMENT... | PR |
| 3 | TOKYO DISTRICT : SUNNY [XX PHARMACEUTICAL] | WEATHER FORECAST |
| 4 | JR LINE : DELAYED [JR EAST] | TRAFFIC INFORMATION |
| ⋮ | ⋮ | ⋮ | ously.

APPARATUS, COMPUTER PROGRAM PRODUCT, AND METHOD FOR DATA DISTRIBUTION

CROSS-REFERENCE TO RELATED APPLICATIONS

This application is based upon and claims the benefit of priority from the prior Japanese Patent Application No. 2006-022669, filed on Jan. 31, 2006; the entire contents of which are incorporated herein by reference.

BACKGROUND OF THE INVENTION

1. Field of the Invention

The present invention relates to a data distribution apparatus, a computer program product for data distribution, and a method for data distribution, that allow distribution of video data to a receiving terminal for a Video on Demand (VOD) service.

2. Description of the Related Art

Wide-spreading use of broadband is accompanied by an increasing popularity in Video on Demand (VOD) service, which is a video distribution service that realizes real-time distribution of video content such as a movie in response to a request from a user over an internet network that operates based on Internet Protocol (IP) (see, for example, Japanese Patent Applications Laid-Opens Nos. H07-107066 and H10-336625).

In recent years, some commercially available television terminals come to be equipped with a VOD function to allow users to enjoy the VOD services. On the other hand, some electronic appliances other than the television terminals are also developed mainly for allowing the user to enjoy audio and video contents provided through analog broadcasting, digital terrestrial broadcasting or the like. One of such appliances is a high-resolution Audio Video Personal Computer (AV-PC). Meanwhile, in Japan, the analog broadcasting is scheduled to be ceased in the year 2011. A ministry considers introducing an IP retransmission of the contents transmitted via digital terrestrial broadcasting for regions where the reception of digital terrestrial broadcasting is difficult. Empirical experiments are also started with television terminals which can receive digital terrestrial broadcasting via IP connection.

In general, data transfer of video data such as MPEG (Moving Picture Experts Group) data takes more time compared with data transfer of text data such as advertisement data. Therefore, when a user desires to watch a movie or the like on the TV terminal, the AV-PC, and the like, using a VOD service, and selects the movie from a top page (for example, Electronic Program Guide (EPG)) of the VOD service, it takes several tens of seconds to acquire the selected movie from a server of a VOD service provider. That is to say, the movie cannot be played instantaneously when the user gives an instruction to play the movie. During the several tens of seconds, a player section that presents the video is kept in a blackout state (a state in which the display shows nothing, thus having a black display). Similarly, when the user watches TV broadcasting on the AV-PC or the like, the player section is kept in the blackout state until the user selects TV broadcasting or a program recorded in the past.

On the other hand, a normal TV broadcasting does not cause the blackout state described above, and a Commercial Message (CM) is broadcasted and the CM video is displayed on the player section while the program is not played. Further, when people watch a movie in a theater, an image such as a movie preview or a cautionary notice for the audience is showed on a screen before a main movie starts so that there is at least something displayed on a screen.

Thus, when the user receives the VOD service by the TV terminal, the AV-PC, or the like, he/she has to wait until a selected video is displayed on the player, watching the player in the blackout state. If the blackout state continues for a while, the user starts to feel stressed since he/she cannot know whether the processing is simply slow or frozen. Therefore the user of the VOD service feels more stressed compared with those who watch the movie in the theater or watch TV broadcasting.

Further, an advertisement presentation such as a banner advertisement is standardized in the VOD service, and the advertisement presentation cannot be changed according to a setting by a user or by a viewing state.

On the other hand, an audience in a movie theater can recognize that the main movie is about to begin since a layout of the movie screen gradually changes while a movie preview or a cautionary notice is shown before the main movie begins. For example, the movie screen gets wider horizontally before the main movie begins.

Though the TV terminal, the AV-PC, or the like comes to achieve higher resolution and be equipped with a larger display, a size of the player cannot be changed depending on the content of presented information and the contents of presented information cannot be changed flexibly in the VOD service. Therefore, realistic sensation, which can be obtained in movie viewing in the movie theater, cannot be realized sufficiently

SUMMARY OF THE INVENTION

According to one aspect of the present invention, a data distribution apparatus includes a data file configured to store video data and advertisement data to be provided to a receiving terminal of a Video on Demand service; a video distributing unit configured to distribute video data in accordance with a distribution request from the receiving terminal; a video presentation confirming unit configured to confirm a presentation state of the video data at the receiving terminal; an advertisement distribution determining unit configured to determine distribution of advertisement data to the receiving terminal when it is confirmed that the video data to be distributed by the video distributing unit is being called; and an advertisement distributing unit configured to distribute the advertisement data.

According to another aspect of the present invention, a computer program product has a computer readable medium including programmed instructions, and the instructions, when executed by a computer, cause the computer to perform distributing video data in accordance with a distribution request from a receiving terminal, the video data being stored in a data file which stores video data and advertisement data to be provided to the receiving terminal of a Video on Demand service; confirming a presentation state of the video data at the receiving terminal; determining distribution of advertisement data to the receiving terminal when it is confirmed that the video data is being called; and distributing the advertisement data.

According to still another aspect of the present invention, a method of data distribution includes distributing video data in accordance with a distribution request from a receiving terminal, the video data being stored in a data file which stores video data and advertisement data to be provided to the receiving terminal of a Video on Demand service; confirming a presentation state of the video data at the receiving terminal;

determining a distribution of advertisement data to the receiving terminal when it is confirmed that the video data is being called; and distributing the advertisement data.

BRIEF DESCRIPTION OF THE DRAWINGS

FIG. 16 is a schematic diagram showing a table T1 that is stored in an advertisement distribution position/timing determining unit;

FIG. 17 is a schematic diagram showing the table T1 that is included in the advertisement distribution position/timing determining unit;

DETAILED DESCRIPTION OF THE INVENTION

Exemplary embodiments of a data distribution apparatus, a computer program product for data distribution, and a method of data distribution will be described in detail below with reference to the accompanying drawings.

A first embodiment of the present invention will be described based on FIGS. 1 to 11.

Figure 1:
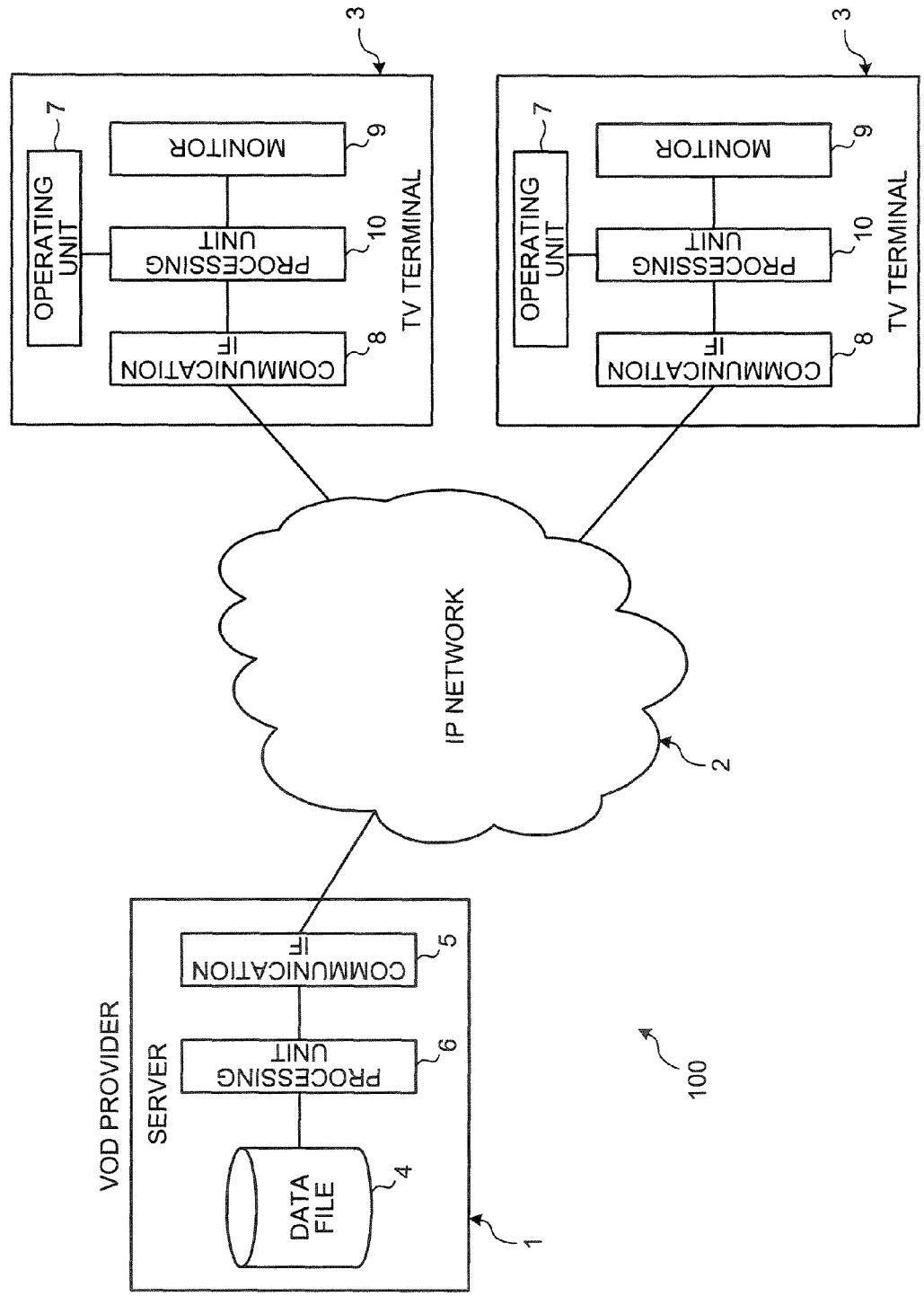
FIG. 1 is a schematic diagram of an example of configuration of a VOD system according to a first embodiment of the present invention.

FIG. 1 is a schematic diagram showing an example of configuration of a VOD system 100 according to the first embodiment of the present invention. As shown in FIG. 1, the VOD system 100 includes a server computer (hereinbelow simply referred to as server) 1, an IP network 2, and plural TV terminals 3. The server 1 is a data distributing apparatus of a VOD provider and distributes video data or the like according to a request from the user. The TV terminal 3 is a receiving terminal which receives video distribution service of the VOD provider. The server 1 and the TV terminals 3 are connected with each other via the IP network 2 such as the Internet that is operated by Internet Protocol (IP). Though more than one server 1 and more than two TV terminals 3 exist in practice, only one server 1 and two TV terminals 3 are shown in FIG. 1 in order to simplify the explanation.

As shown in FIG. 1, the server 1 includes a data file 4, a communication interface (IF) 5, a processing unit 6, and the like. The data file 4 stores video data as MPEG data and advertisement data as text data to be provided to each of the TV terminals 3. The communication IF 5 transmits/receives data to/from each of the TV terminals 3 through the IP network. The processing unit 6 is configured with a Central Processing Unit (CPU), Read Only Memory (ROM), Random Access Memory (RAM), and the like not shown. The CPU operates utilizing a work area of the RAM based on a program stored in the ROM to execute various processing. When real-time distribution is an important feature, high-speed processing is required. To realize the high-speed processing, it is desirable that a separate logical circuit (not shown) is provided and various computations is realized by the operation of the logical circuit.

The program to be executed at the processing unit 6 can be stored in a computer-readable recording medium such as a Compact Disk Read Only Memory (CD-ROM), a flexible disk (FD), a Compact Disk Recordable (CD-R), and a Digital Versatile Disk (DVD), and provided. Here, the program to be executed is in installable format or in executable format. The CPU of the processing unit 6 reads out the program from the recording medium in order to load the program to a main memory. Consequently, various functions for the server 1 are realized. Further, the program can be provided by storing the program in a computer (not shown) that is connected to the IP network 2 and by downloading the program through the network.

On the other hand, the TV terminal 3 includes an operating unit 7, a communication IF 8, a monitor 9, a processing unit 10, and the like. The user of the TV terminal 3 inputs a request, such as a transmission request from the operating unit 7 to obtain video data from the server 1. The communication IF 8 serves to transmit various requests to the server 1 and to receive video data supplied from the server 1. The monitor 9 serves to display the received video data, and is realized by a Plasma Display Panel (PDP), a Liquid Crystal Display (LCD), or the like. The operating unit 7 includes a remote controller and the like. The processing unit 10 is configured with the CPU, the ROM, the RAM, and the like, and various processes are executed by the operation of the CPU using the work area of the RAM based on a program stored in the ROM. Similarly to the processing unit 6 of the server 1, when real-time distribution is an important feature, it is desirable that a separate logical circuit (not shown) is provided and various computations is realized by the operation of the logical circuit. Further, a program to be executed at the processing unit 10 can be stored in a computer-readable recording medium and provided, or the program can be provided by downloading the program through the network, similarly to the program to be executed at the processing unit 6 of the server 1.

In the VOD system 100 having above configurations, the user inputs a transmission request for video data by designating a title of the video data using the operating unit 7 of the TV terminal 3, which is connected to the server 1 via the IP network 2. The transmission request is sent to the server 1 which stores plural video data in the data file 4. Then, the server 1 reads out the designated video data from the data file 4 and sends the read-out video data to the TV terminal 3, which is a request sender. On receiving the video data, the TV terminal 3 reproduces the video data supplied from the server 1 online and displays the same on the monitor 9.

The processing unit 6 of the server 1, and the processing unit 10 of the TV terminal 3 perform various computations. Characteristic computations of the first embodiment among those computations will be described below.

Figure 2:
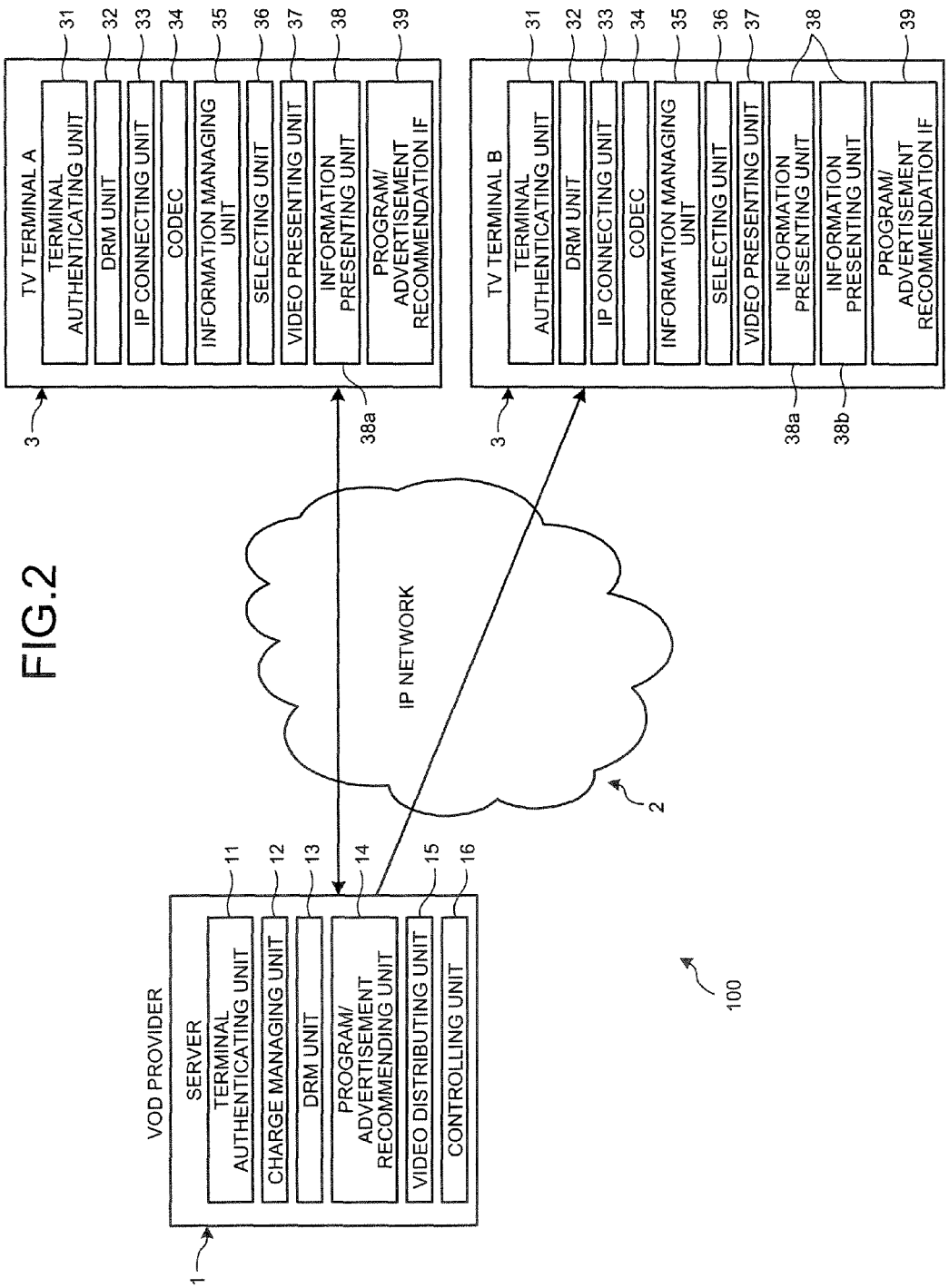
FIG. 2 is a block diagram schematically showing a functional structure of the VOD system.

FIG. 2 is a schematic block diagram of a functional structure of the VOD system 100. As shown in FIG. 2, the processing unit 6 of the server 1 has a terminal authenticating unit 11, a charge managing unit 12, a Digital Rights Management (DPM) unit 13, a program/advertisement recommending unit 14, a video distributing unit 15, and a controlling unit 16 that controls each of the units.

The terminal authenticating unit 11 has a function of checking whether or not the TV terminal 3 is a subscribing receiving terminal and authenticating the subscribing receiving terminal. The charge managing unit 12 has a function of charging the user for a video program distributed to the TV terminal 3 that is a subscribing receiving terminal. The DRM unit 13 has a function of managing copyrights of the video program distributed to the TV terminal 3 that is a subscribing receiving terminal.

Further, the video distributing unit 15 has a function of distributing video data such as a video program or advertisement information stored in the data file 4. The program/advertisement recommending unit 14 has a function of recommending the user of each TV terminal 3 to watch the program or the advertisement in accordance with the video program and the advertisement information distributed by the video distributing unit 15 in the past.

The processing unit 10 of the TV terminal 3 includes a terminal authenticating unit 31, a DRM unit 32, an IP connecting unit 33, a coder/decoder (CODEC) 34, an information managing unit 35, a selecting unit 36, an video presenting unit 37, an information presenting unit 38, and a program/advertisement recommendation IF 39.

The information managing unit 35 has a function of managing information transmission among the terminal authenticating unit 31, the DRM unit 32, the IP connecting unit 33, the CODEC 34, the selecting unit 36, the video presenting unit 37, the information presenting unit 38, and the program/advertisement recommendation IF 39.

The terminal authenticating unit 31 stores a terminal ID so that the server 1 of the VOD provider can check whether the TV terminal 3 is a subscribing terminal or not based on the terminal ID and authenticate the subscribing terminal. The DRM unit 32 has a function of managing copyrights of video sent from the server 1. The selecting unit 36 has a function of receiving a video selection instruction or the like from the operating unit 7. The IP connecting unit 33 has a function of connecting the TV terminal 3 to the server 1 of the VOD provider, transmitting the terminal ID stored in the terminal authenticating unit 31, and receiving video or other information selected by the selecting unit 36. The CODEC 34 has a function of decoding the received video (MPEG data, for example).

The program/advertisement recommendation IF 39 has a function of controlling a presentation of information distributed from the program/advertisement recommending unit 14 of the server 1 of the VOD provider and transmitting the information selected at the selecting unit 36.

The video presenting unit 37 is generally called as a "player", and has a function of presenting the video on the monitor 9 after decoded by the CODEC 34. The information presenting unit 38 has a function of presenting information other than video, such as advertisement or a program listing, on the monitor 9. The information presenting unit 38 can be classified into two types depending on a manner of presentation. One type of the information presenting unit 38 presents the information other than the video such as the advertisement and the program listing independently from the video presented by the video presenting unit 37. The other type of the information presenting unit 38 presents the program listing or the advertisement information in a way so that the program listing or the advertisement information overlaps with the video presented by the video presenting unit 37. Hereinbelow, the first type and the second type of the information presenting unit 38 will be denoted respectively by reference characters 38*a* and 38*b*.

Figure 3:
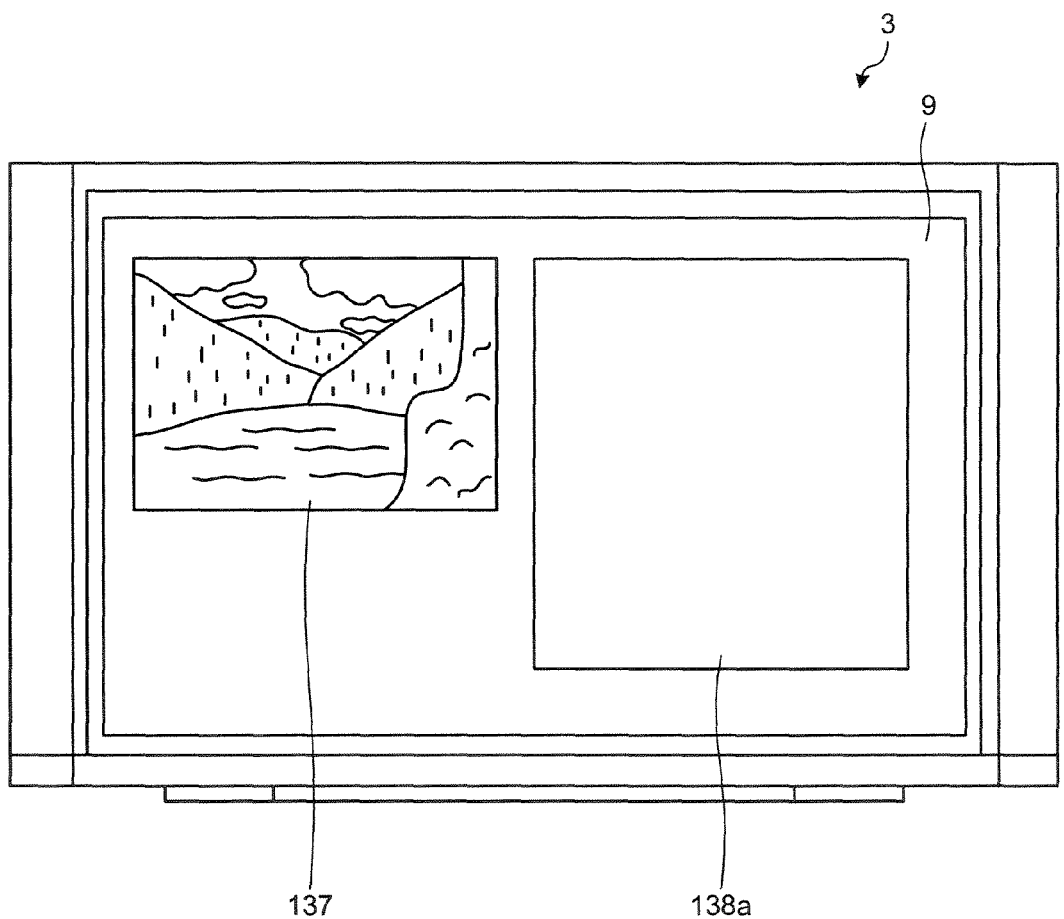
FIG. 3 is an elevational view of an example of video display at a monitor of a TV terminal.

FIG. 3 is an elevational view of an example of a video display on the monitor 9 of the TV terminal 3. In the example of FIG. 3, the information other than the video such as the advertisement or the program listing is presented by the information presenting unit 38*a*. In the example shown in FIG. 3, a display region 137 controlled by the video presenting unit 37, i.e., the player, and a display region 138*a* controlled by the information presenting unit 38*a* are arranged side by side. The video display as shown in FIG. 3 is given by a TV terminal A (see FIG. 2) which has the information presenting unit 38*a* but not 38*b*.

Figure 4:
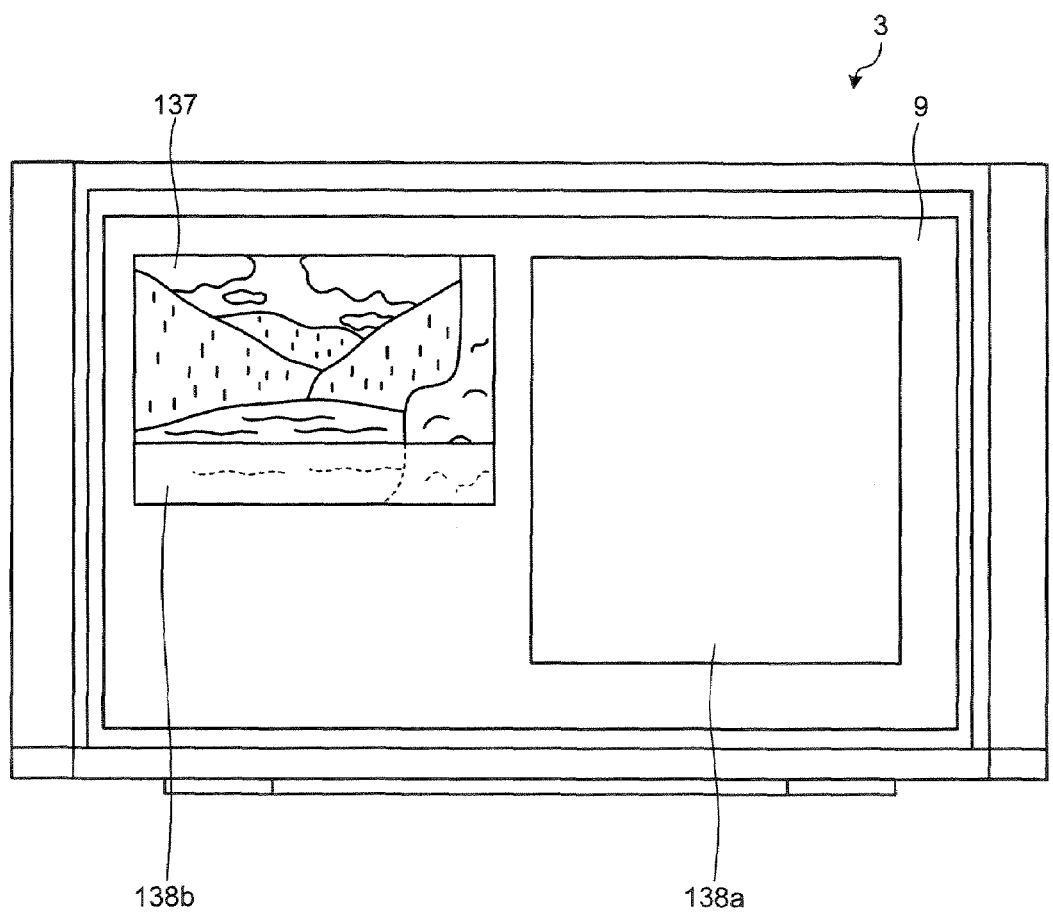
FIG. 4 is an elevational view of another example of video display at the monitor of the TV terminal.

On the other hand, FIG. 4 is an elevational view of another example of video display on the monitor 9 of the TV terminal 3. In the example shown in FIG. 4, both the information presenting unit 38*a* and the information presenting unit 38*b* present the information other than the video, such as the advertisement and the program listing. In FIG. 4, the display region 138*a* is arranged next to the display region 137, and the display region 138*b* which is controlled by the information presenting unit 38*b* is arranged over and overlaps with the display region 137. The video display as shown in FIG. 4 is given by a TV terminal B (see FIG. 2) which has both the information presenting unit 38*a* and the information presenting unit 38*b*. In FIG. 4, the display region 138*b* is illustrated translucently in order to distinguish the display region 138*b* from other regions; however, the display region 138*b* is practically transparent. Thus, the video played on the display region 137 is not practically obstructed by the display region 138*b*.

Figure 5:
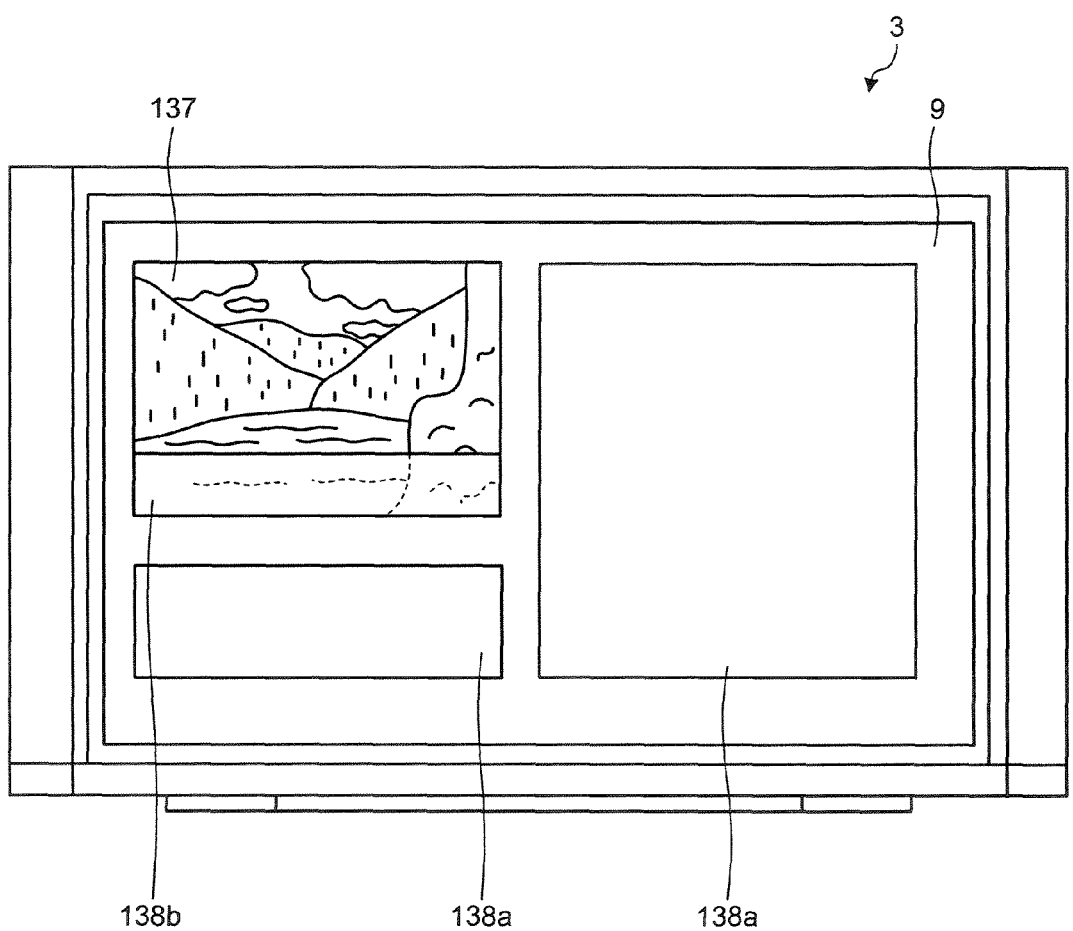
FIG. 5 is an elevational view of still another example of video display at the monitor of the TV terminal.

The embodiment of the information presenting unit 38 is not limited to those shown in FIGS. 3 and 4, and another display region 138*a* controlled by another information presenting unit 38*a* can be provided below the display region 137 as shown in FIG. 5, for example.

Figure 6:
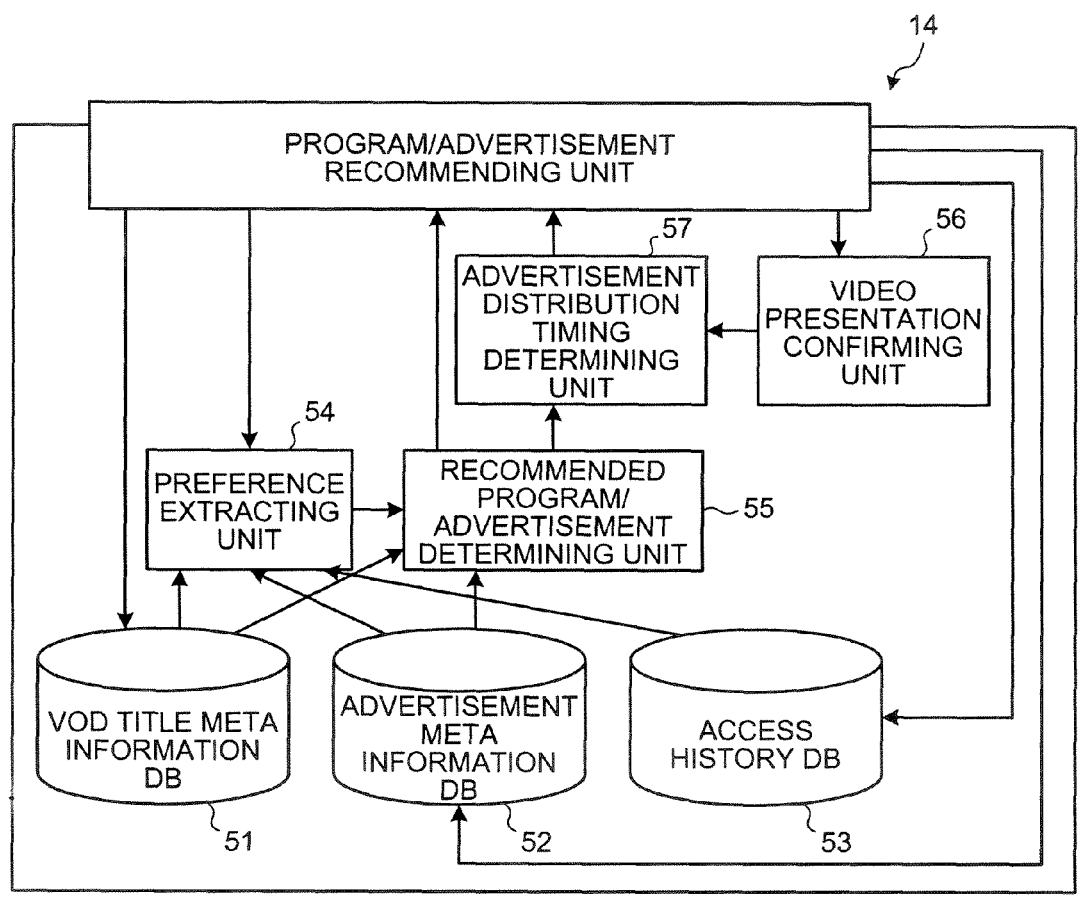
FIG. 6 is a block diagram showing an internal configuration of a program/advertisement recommending unit.
Figure 7:
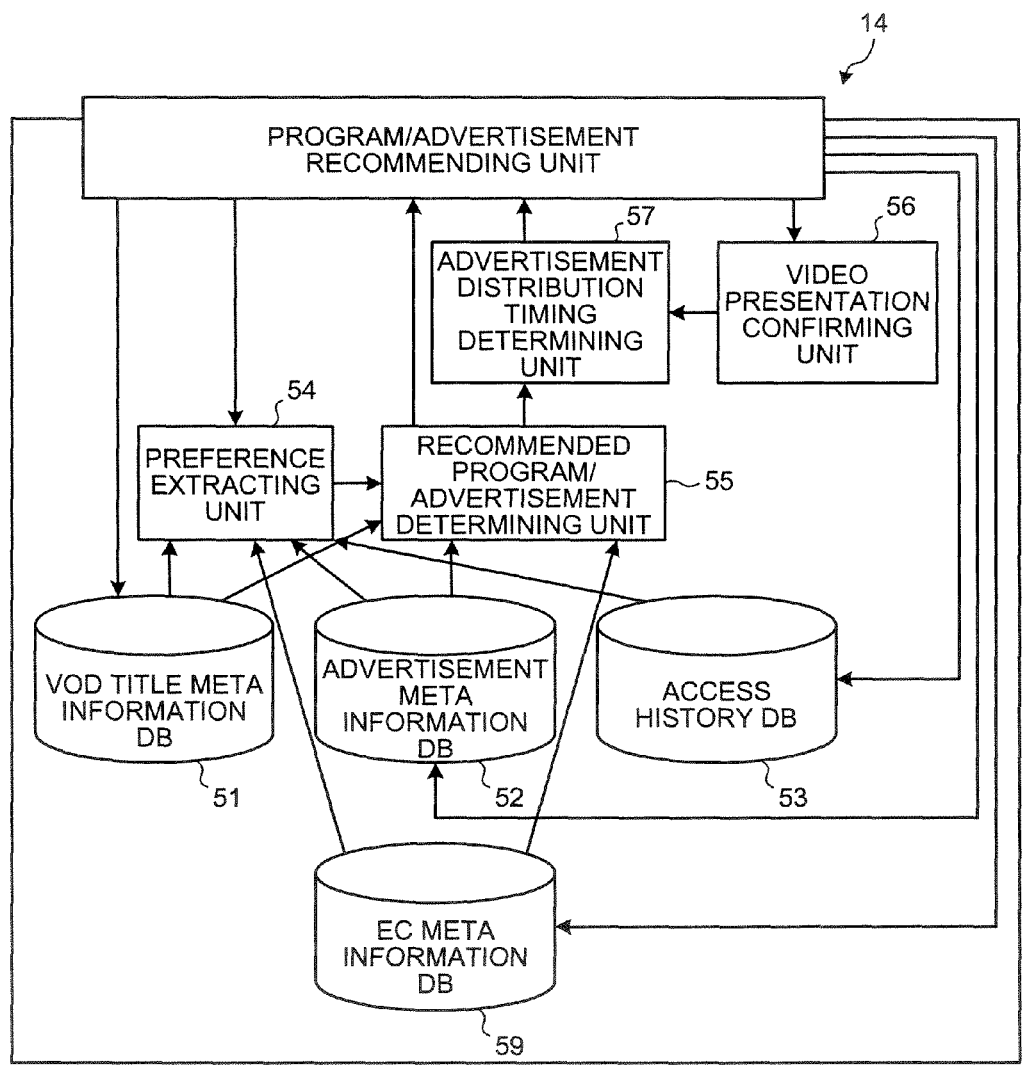
FIG. 7 is a block diagram showing a modification of the internal configuration of the program/advertisement recommending unit.

Next, the program/advertisement recommending unit 14 of the server 1 is described in detail. FIG. 6 is a block diagram showing an internal configuration of the program/advertisement recommending unit 14. The program/advertisement recommending unit 14, which has a function of recommending a program or an advertisement to user of each TV terminal 3 in accordance with the video program and the advertisement information distributed by the video distributing unit 15 thereto, is provided with a VOD title meta information Database (DB) 51, an advertisement meta information DB 52, an access history DB 53, a preference extracting unit 54, a recommended program/advertisement determining unit 55, a video presentation confirming unit 56, and an advertisement distribution timing determining unit 57 as shown in FIG. 6.

The VOD title meta information DB 51 accumulates meta information of a title of a video program distributed by the video distributing unit 15, and the accumulated meta information is used for recommendation of program and advertisement. The advertisement meta information DB 52 accumulates meta information of advertisement data (advertisement information) distributed by the video distributing unit 15. The access history DB 53 accumulates access history to a VOD introduction page, a viewed VOD, a viewed TV program, and a clicked advertisement in association with the terminal ID of each TV terminal 3.

The preference extracting unit 54 extracts preference of the terminal user based on the data accumulated in each of the VOD title meta information DB 51, the advertisement meta information DB 52, and the access history DB 53. The recommended program/advertisement determining unit 55 determines which program or advertisement to recommend from the VOD title meta information DB 51 and the advertisement meta information DB 52 based on the preference extracted by the preference extracting unit 54. The preference extracting unit 54 and the recommended program/advertisement determining unit 55 may operate according to some proposed algorithms. For example, a proposed program selection support system determines a program to recommend according to a degree of coincidence or frequency of characteristics of programs user watches; a proposed information searching method and an information searching apparatus perform statistical processing on preference vectors of all users and recommend information suitable for preference of a predetermined group of users depending on the statistic; and another proposed information searching apparatus, an information receiving apparatus, and an information searching method learn preference vector of a user based on a viewing history and select one of plural preference patterns.

The video presentation confirming unit 56 confirms a presentation state of the video presenting unit 37 of the TV terminal 3. The advertisement distribution timing determining unit 57 serves as an advertisement distribution determining unit and determines timing of the distribution of the recommended program or the recommended advertisement determined at the recommended program/advertisement determining unit 55, based on a result of confirmation by the video presentation confirming unit 56.

In FIG. 6, the preference is extracted based on the video program or the advertisement information that the user watches; though the manner of extraction is not limited thereto. For example, it is possible to utilize information on commodities that the user purchases via Electronic Commerce after clicking the advertisement shown on the TV terminal 3. Such extraction can be realized by a configuration as shown in FIG. 5 where a history of purchased products is accumulated in the access history DB 53 and an EC meta information DB 59 accumulating meta information of the purchased products is added to the configuration of FIG. 4.

Figure 8:
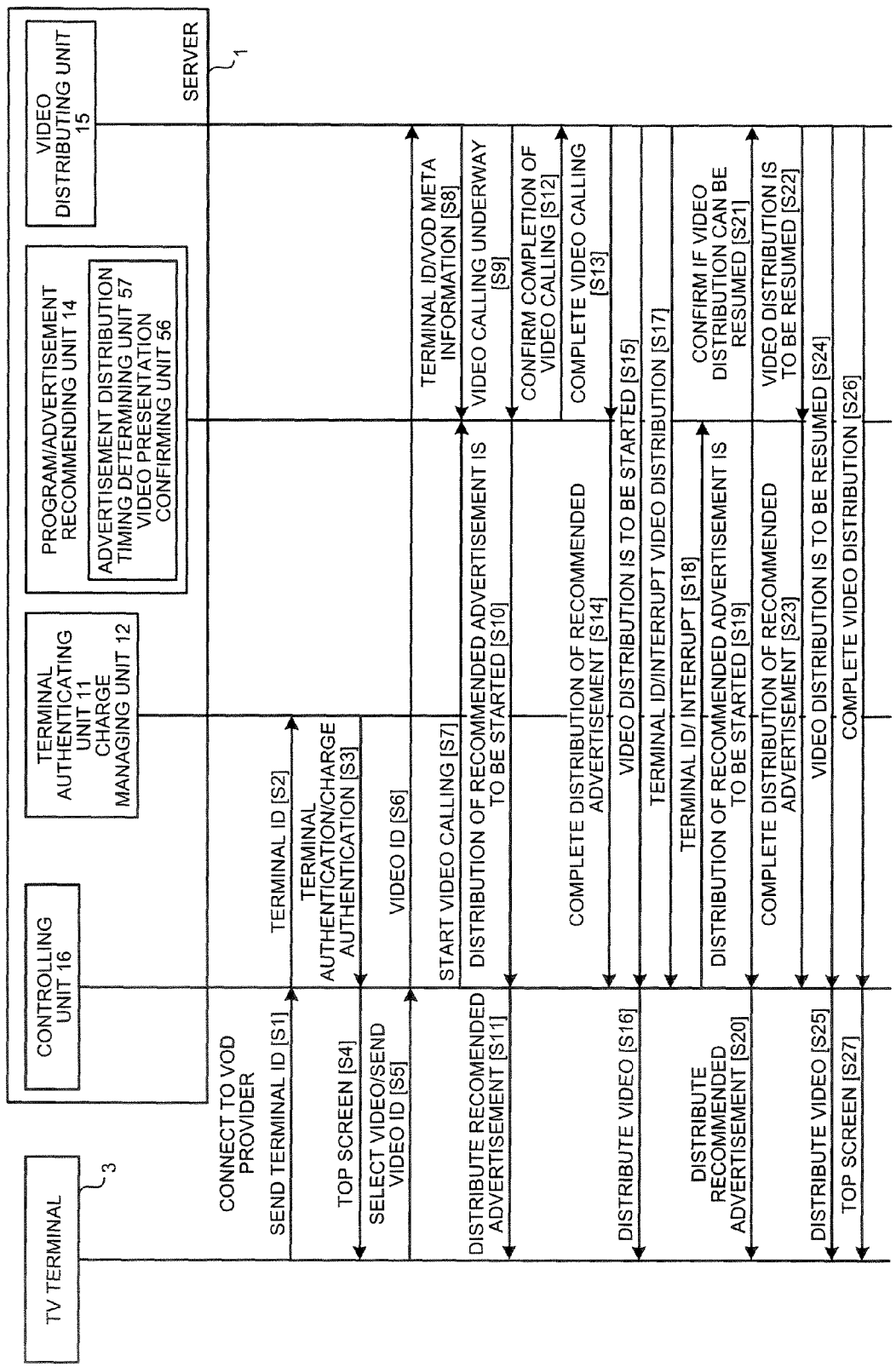
FIG. 8 is a sequence diagram showing a flow of a video distribution process.

A video distribution process by the program/advertisement recommending unit 14 and the video distributing unit 15 will be described below with reference to FIG. 8.

First, in the TV terminal 3, an instruction is sent from the operating unit 7 to the selecting unit 36 to connect to the VOD provider. In response to the instruction, the TV terminal 3 sends the terminal ID (XXX) of the TV terminal 3 to the server 1 of the VOD provider via the IP connecting unit 33 (step S1).

The controlling unit 16 of the server 1 of the VOD provider sends the received terminal ID (XXX) to the terminal authenticating unit 11 to check whether or not the TV terminal 3 is a subscribing receiving terminal (step S2).

The terminal authenticating unit 11 of the server 1 checks whether the terminal ID (XXX) sent from the TV terminal 3 is authentic, and sends the result to the charge managing unit 12 if the terminal ID (XXX) is authentic. The charge managing unit 12 performs charge authentication. When the charge managing unit 12 authenticates the received terminal ID (XXX), the result is sent to the controlling unit 16 of the server 1 (step S3). The processing to be performed when the authentication is not successful is not described here.

In response to the above-described result, the controlling unit 16 of the server 1 opens a TOP screen at the monitor 9 of the TV terminal 3. The TOP screen provides, for example, an EPG as a menu screen.

When the user of the TV terminal 3 selects a desired video from the EPG, which is a menu screen displayed on the TOP screen, a video ID of the selected video is sent to the selecting unit 36, and further to the server 1 of the VOD provider (step S5).

The controlling unit 16 of the server 1 of the VOD provider sends the received video ID to the video distributing unit 15 (step S6). At the same time, the controlling unit 16 of the server 1 of the VOD provider notifies the program/advertisement recommending unit 14 that the video calling is started for the terminal ID (XXX) (step S7).

The video distributing unit 15 that receives the video ID sends the VOD meta information in accordance with the terminal ID and the video ID to the program/advertisement recommending unit 14 (step S8). The program/advertisement recommending unit 14 that receives the VOD meta information records the terminal ID and the VOD meta information in the access history DB 53. In addition, the video distributing unit 15 notifies the program/advertisement recommending unit 14 that the video is being called (step S9).

In the program/advertisement recommending unit 14 that is notified that the video is being called, the recommended program/advertisement determining unit 55 determines program information or advertisement information to be distributed for the terminal ID (XXX). The determined advertisement information is sent to the controlling unit 16, and the controlling unit 16 prepares to distribute the advertisement information. The advertisement information to be distributed is different for each TV terminal having a different terminal ID since the access history is different for each TV terminal. Further, even if the terminal ID of the request sender is the same, if the selected video, i.e., the selected VOD meta information is different, the recommended advertisement information changes accordingly.

In addition, when the program/advertisement recommending unit 14 is notified that the video is being called, the video presentation confirming unit 56 confirms to the video distributing unit 15 that the video is not presented in the display region 137 controlled by the video presenting unit 37 of the TV terminal 3. At the same time, the advertisement distribution timing determining unit 57 determines to distribute the advertisement, and the program/advertisement recommending unit 14 notifies the controlling unit 16 of the server 1 that the distribution of the recommended advertisement is to be started (step S10).

Then, the controlling unit 16 of the server 1 distributes the recommended advertisement prepared in step S10 (step S11).

Figure 9:
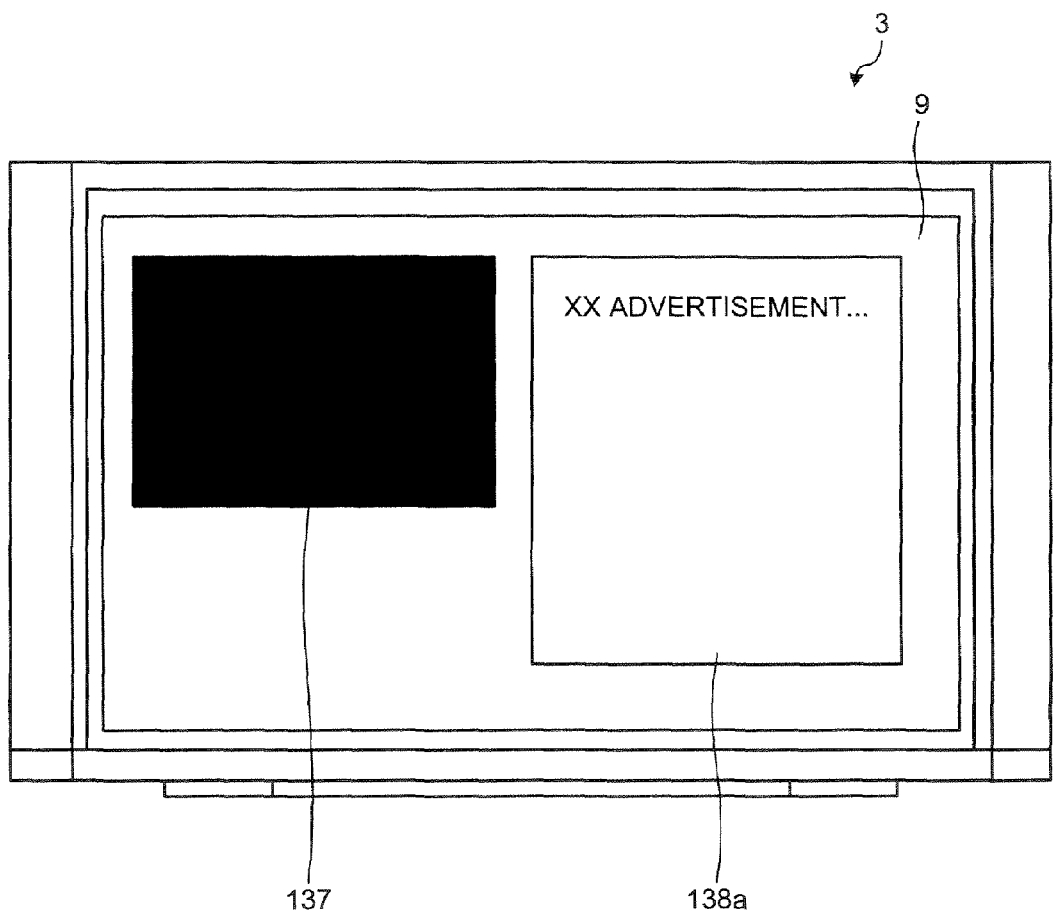
FIG. 9 is an elevational view of an example of advertisement display at the monitor of the TV terminal.
Figure 10:
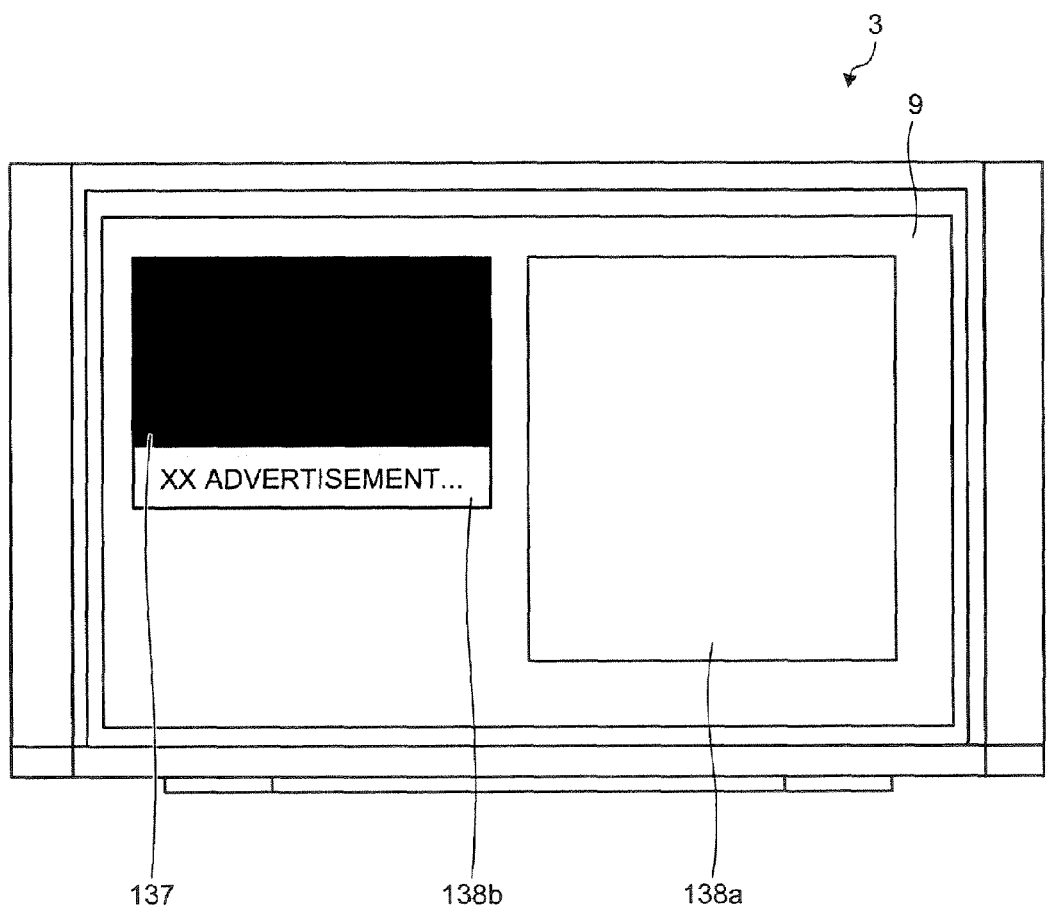
FIG. 10 is an elevational view of another example of advertisement display at the monitor of the TV terminal.

When the TV terminal 3 is the TV terminal A of FIG. 2, the advertisement information is presented in the display region 138a of the monitor 9 as shown in FIG. 9. On the other hand, when the TV terminal 3 is the TV terminal B of FIG. 2, the advertisement information is presented in the display region 138b of the monitor 9 as shown in FIG. 10.

Then, the video presentation confirming unit 56 of the program/advertisement recommending unit 14 confirms to the video distributing unit 15 whether or not the video calling is ended (step S12). When the video calling is completed, the video distributing unit 15 notifies the video presentation confirming unit 56 of the program/advertisement recommending unit 14 that the video calling has been ended (step S13). When the video calling has not completed, the steps S10, S11, and S12 are repeated.

When notified of the completion of video calling, the video presentation confirming unit 56 of the program/advertisement recommending unit 14 notifies the advertisement distribution timing determining unit 57 that the presentation of the video in the video presenting unit 37 of the TV terminal 3 is to be started. Then, the advertisement distribution timing determining unit 57 notifies the controlling unit 16 that the distribution of the recommended advertisement is ended (step S14), and the video distributing unit 15 notifies the controlling unit 16 that the video distribution is to be started (step S15).

Consequently, the controlling unit 16 of the server 1 starts to distribute the video to the TV terminal 3 (step S16), and the video is displayed in the display region 137 of the monitor 9 as shown in FIGS. 3 to 5.

That is to say, the video presentation confirming unit 56 confirms to the video distributing unit 15 that the video is not presented in the display region 137, and the advertisement distribution timing determining unit 57 determines the distribution of the advertisement until the video presentation confirming unit 56 is notified from the video distributing unit 15 that the video calling has been ended. Consequently, the recommended advertisement is displayed until the video selected by the user is displayed during the reception of the VOD service by the TV terminal 3; therefore, the blackout state can be avoided.

If the video distribution is interrupted for some reason, the video distributing unit 15 notifies the controlling unit 16 that the video distribution for the terminal ID (XXX) is interrupted (step S17). The controlling unit 16, which is notified that the video distribution is interrupted, notifies the program/advertisement recommending unit 14 that the video distribution for the terminal ID (XXX) is interrupted (step S18).

The advertisement distribution timing determining unit 57 of the program/advertisement recommending unit 14 starts to distribute the recommended advertisement for the terminal ID (XXX) (step 19) when the program/advertisement recommending unit 14 is notified that the video distribution is interrupted. Then, the recommended advertisement is distributed to the TV terminal 3 similarly to step S11 (step S20).

Then, the video presentation confirming unit 56 of the program/advertisement recommending unit 14 confirms whether or not it is possible to resume the distribution of the video (step S21). When the video distributing unit 15 confirms that the video distribution can be resumed, the video distributing unit 15 notifies the video presentation confirming unit 56 of the program/advertisement recommending unit 14 that the video distribution can be resumed (step S22).

The video presentation confirming unit 56 of the program/advertisement recommending unit 14 notifies the advertisement distribution timing determining unit 57 that the presentation of the video by the video presenting unit 37 of the TV terminal 3 is to be started when notified that the video distribution can be resumed. Then, the advertisement distribution timing determining unit 57 notifies the controlling unit 16 that the distribution of the recommended advertisement is to be ended, and the video distributing unit 15 notifies the controlling unit 16 that the video distribution is to be resumed (step S24).

That is to say, the advertisement distribution timing determining unit 57 determines the distribution of the advertisement until the video presentation confirming unit 56 notifies the controlling unit 16 that the video distribution can be resumed. Consequently, the recommended advertisement is displayed until the video selected by the user is displayed; therefore, the blackout state can be avoided.

Thus, the controlling unit 16 of the server 1 resumes the video distribution to the TV terminal 3 (step S25).

When the video distribution by the video distributing unit 15 of the server 1 ends, the controlling unit 16 is notified that the video distribution is ended (step S26), and the display on the TV terminal 3 returns to the TOP screen (step S27).

According to the present embodiment, when the video presentation confirming unit 56 confirms that the video data to be distributed by the video distributing unit 15 is being called, the advertisement distribution timing determining unit 57 determines to distribute the advertisement data to the TV terminal 3. Consequently, the advertisement data (text data) is displayed until the video data (MPEG data) selected by the user is displayed, while the TV terminal 3 is used to receive the VOD service; therefore, the blackout state at the TV terminal 3 can be avoided. Further, the advertisement distribution timing determining unit 57 determines to distribute the advertisement data to the TV terminal 3 until the video presentation confirming unit 56 confirms that the calling of the video data by the video distributing unit 15 is ended.

Figure 11:
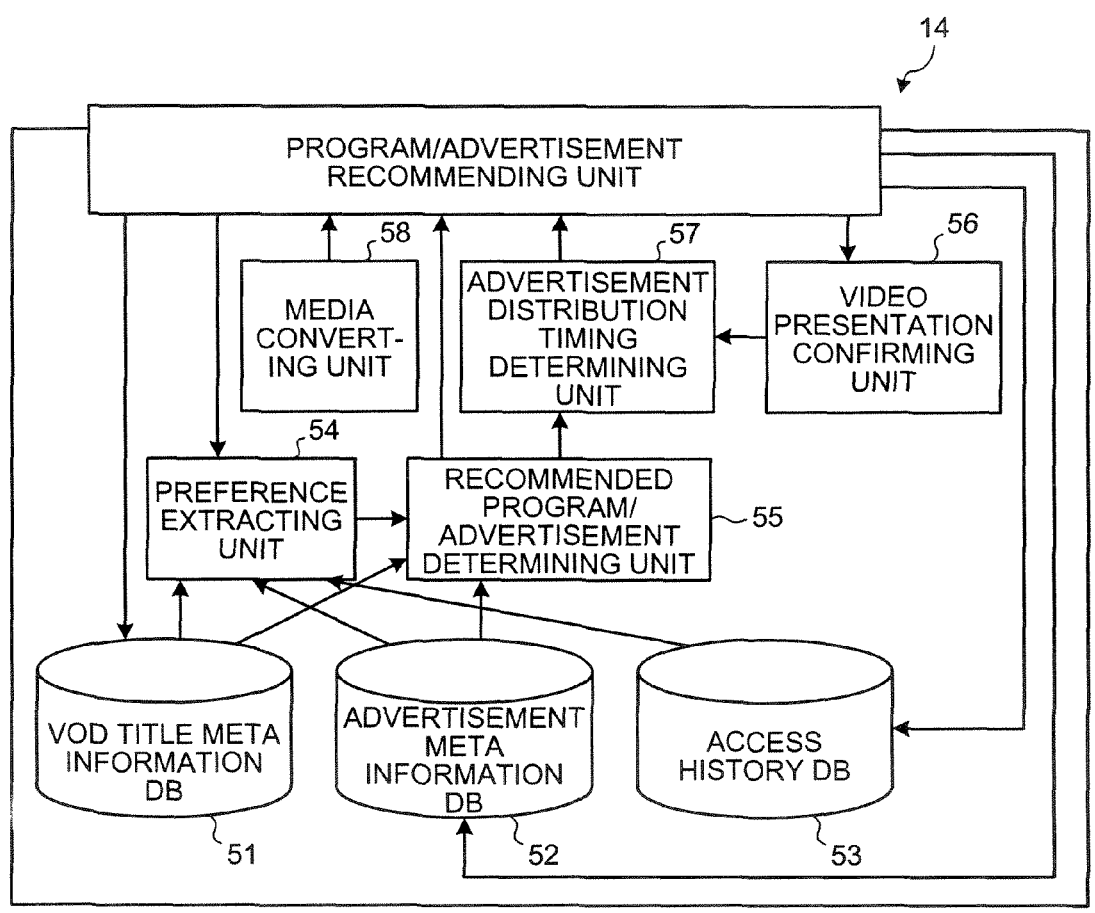
FIG. 11 is a block diagram showing a modification of the internal configuration of the program/advertisement recommending unit.

The advertisement information is presented only as text information in the present embodiment; however, the present invention is not limited to the present embodiment. For example, a media converting unit 58 that functions as a data converting unit can be added to the program/advertisement recommending unit 14 as shown in FIG. 11, and the text information can be converted to voice by a voice synthesis.

Figure 13:
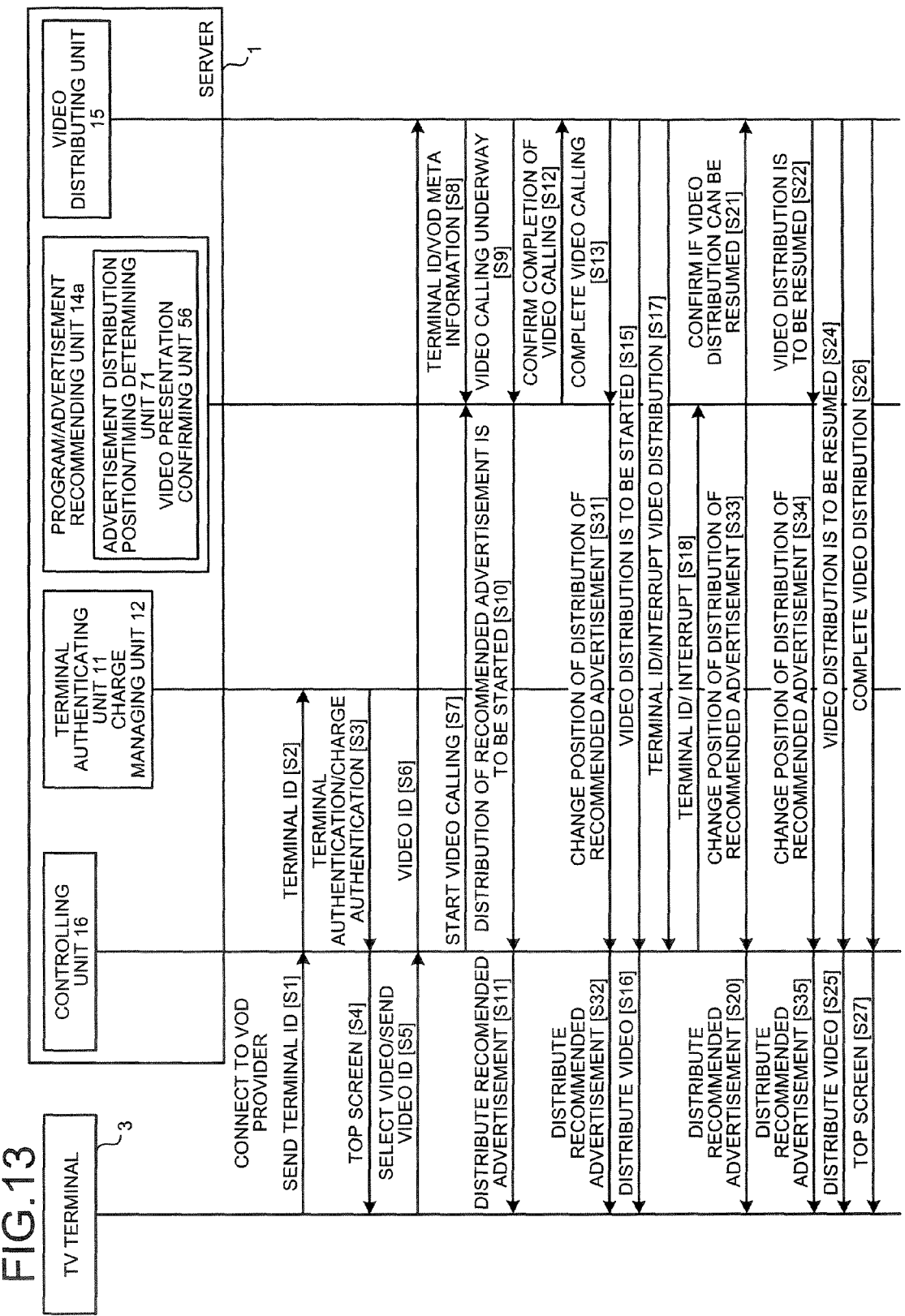
FIG. 13 is a sequence diagram showing a flow of a video distribution process.
Figure 14:
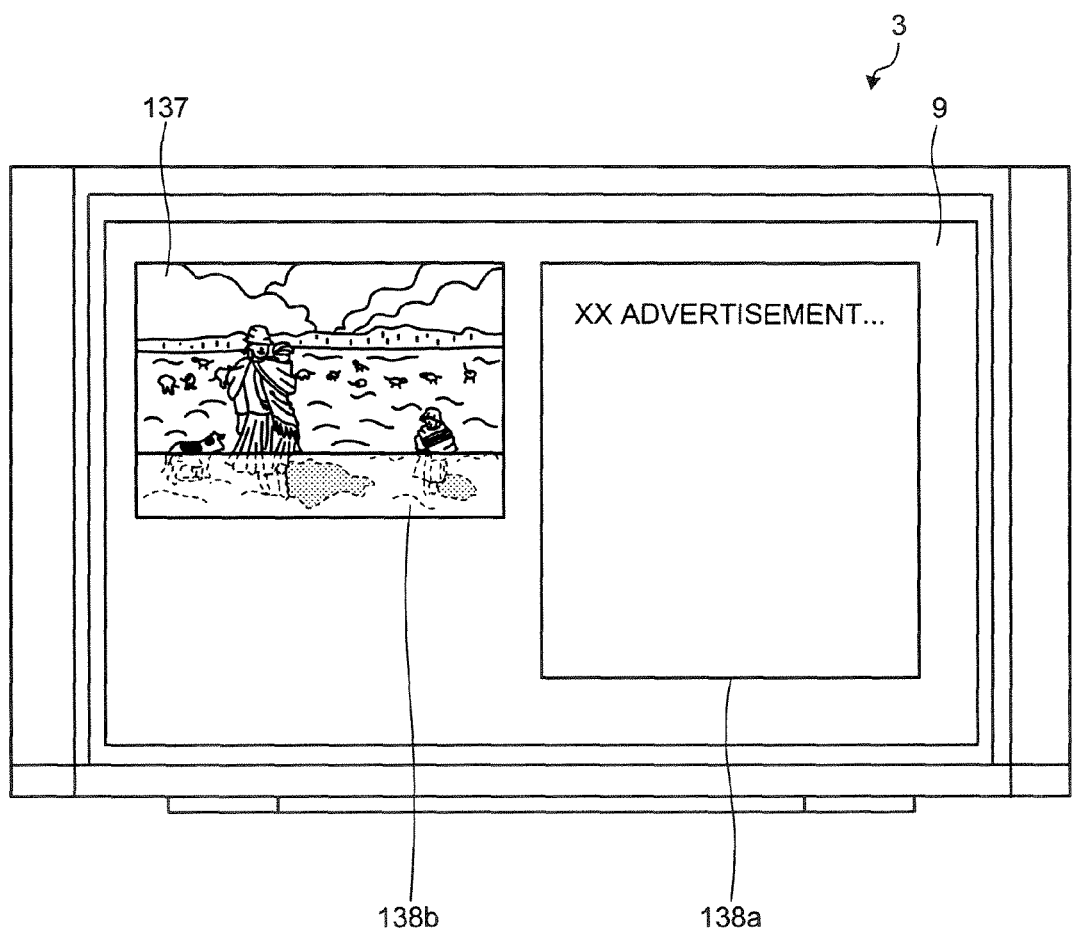
FIG. 14 is an elevational view showing an example of video and advertisement display at the monitor of the TV terminal.

A second embodiment of the present invention will be described below with reference to FIGS. 12 to 14. Explanations for the units in the embodiment below that are the same as the first embodiment will not be repeated, and the same reference characters are assigned to the same units.

In the first embodiment, the advertisement distribution timing determining unit 57 determines to distribute the advertisement until the video presentation confirming unit 56, which confirms the video presentation state at the display region 137 controlled by the video presenting unit 37 of the TV terminal 3, notifies that the video calling is ended; therefore, the recommended advertisement is displayed on the TV terminal 3 which is employed for VOD service reception until the video selected by the user is displayed. In the second embodiment, the recommended advertisement is displayed at a different position on the display even after the video selected by the user starts to be played.

Figure 12:
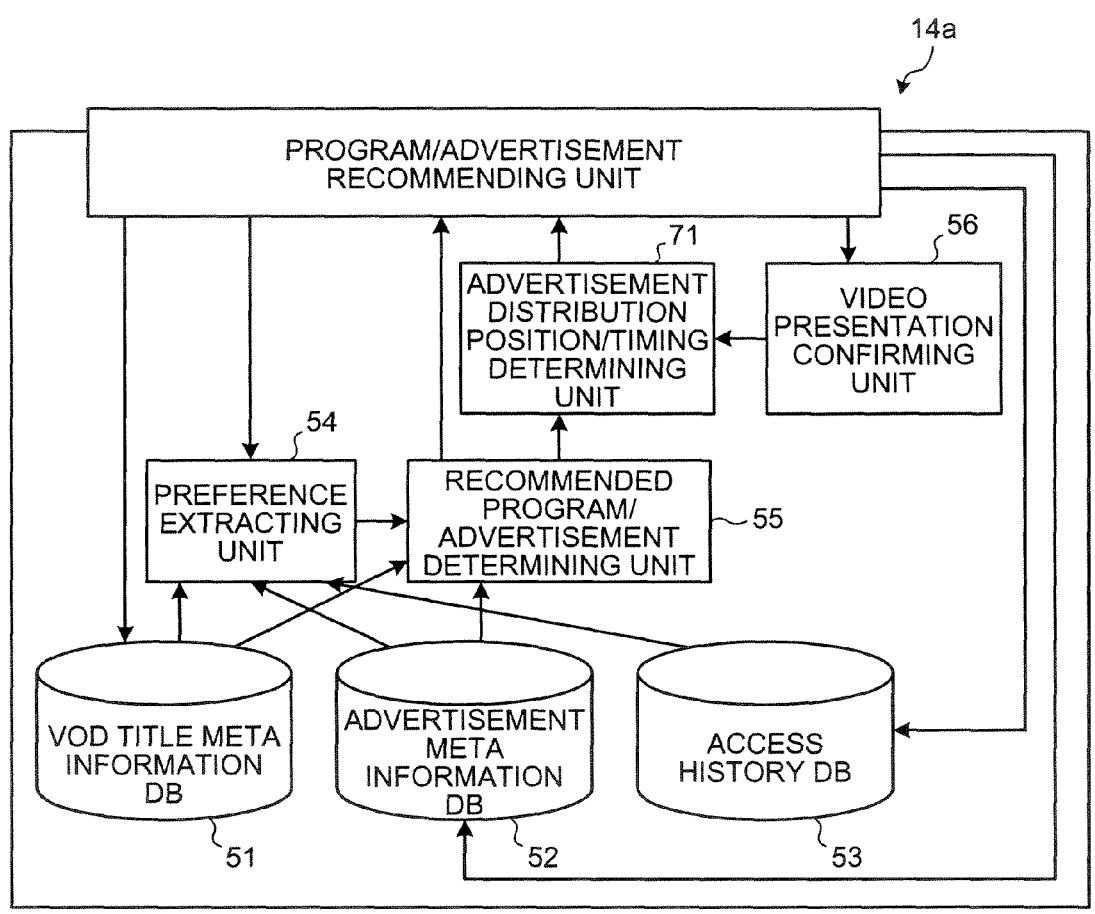
FIG. 12 is a block diagram showing an internal configuration of a program/advertisement recommending unit according to a second embodiment of the present invention.

FIG. 12 is a block diagram showing an internal configuration of the program/advertisement recommending unit 14a according to the second embodiment of the present invention. As shown in FIG. 12, an advertisement distribution position/timing determining unit 71 that functions as the advertisement distribution determining unit is provided in the program/advertisement recommending unit 14a according to the second embodiment of the present invention as substitute for the advertisement distribution timing determining unit 57 provided in the program/advertisement recommending unit 14 of the first embodiment.

A video distribution process by the program/advertisement recommending unit 14a and the video distributing unit 15 is described with reference to FIG. 13. Here, a flow of the video distribution process different from the flow of the video distribution process of the first embodiment described with reference to FIG. 8 is described.

In the first embodiment, when the video calling is ended (step S13), the advertisement distribution is ended (step S14). On the other hand, the advertisement distribution is not ended even when the video calling is ended (step S13) in the second embodiment. In the present embodiment, the advertisement distribution position/timing determining unit 71 of the program/advertisement recommending unit 14a, when notified that the video calling is ended, changes the position of distribution of the recommended advertisement (step S31), and the controlling unit 16 of the server 1 distributes the recommended advertisement to the position after the change in step S31 (step S32). As a result, although the advertisement is displayed in the display region 138b, which is controlled by the information presenting unit 38b and overlaps with the display region 137, before the video calling is ended (see FIG. 10), the advertisement is displayed in the display region 138a controlled by the information presenting unit 38a after the completion of the video calling as shown in FIG. 14. Thus, the advertisement is displayed at a different position on the monitor 9 of the TV terminal 3 after the completion of video calling.

Further, the position where the recommended advertisement is displayed is also changed when the video distribution is interrupted. In the first embodiment, the advertisement distribution resumes when the video distribution is interrupted (step S19). On the other hand, in the second embodiment, the advertisement distribution position/timing determining unit 71 changes the position of distribution of the recommended advertisement (step S33), and the controlling unit 16 of the server 1 distributes the recommended advertisement to the position changed in step S33 (step S20). As a result, the display state returns from the state shown in FIG. 14 to the state shown in FIG. 10, without an interruption of advertisement distribution.

Similarly, the advertisement distribution position/timing determining unit 71 of the program/advertisement recommending unit 14a changes the position of distribution of the recommended advertisement (step S34) when the video distribution is resumed (step S22). Consequently, the controlling unit 16 of the server 1 distributes the recommended advertisement to the position changed in step S34 (step S35).

According to the second embodiment, when the video presentation confirming unit 56 confirms that the video data calling by the video distributing unit 15 is ended, the advertisement distribution position/timing determining unit 71 determines to distribute the advertisement data to the TV terminal 3 and at the same time changes the position the advertisement data is to be displayed on the TV terminal 3. Consequently, it can be avoided that the advertisement data overlaps with the video data.

A third embodiment of the present invention is explained below with reference to FIGS. 15 to 19. Explanations for the units in the embodiment below that are the same as the first and the second embodiments will not be repeated, and the same reference characters are assigned to the same units.

In the second embodiment, the position of distribution of the recommended advertisement is changed and the recommended advertisement is kept displayed even after the video selected by the user is displayed. In the third embodiment, the position of distribution is not uniformly changed, but determined according to the genre of the recommended advertisement. Thus, the recommended advertisement is displayed at an appropriate position depending on the genre thereof.

Figure 15:
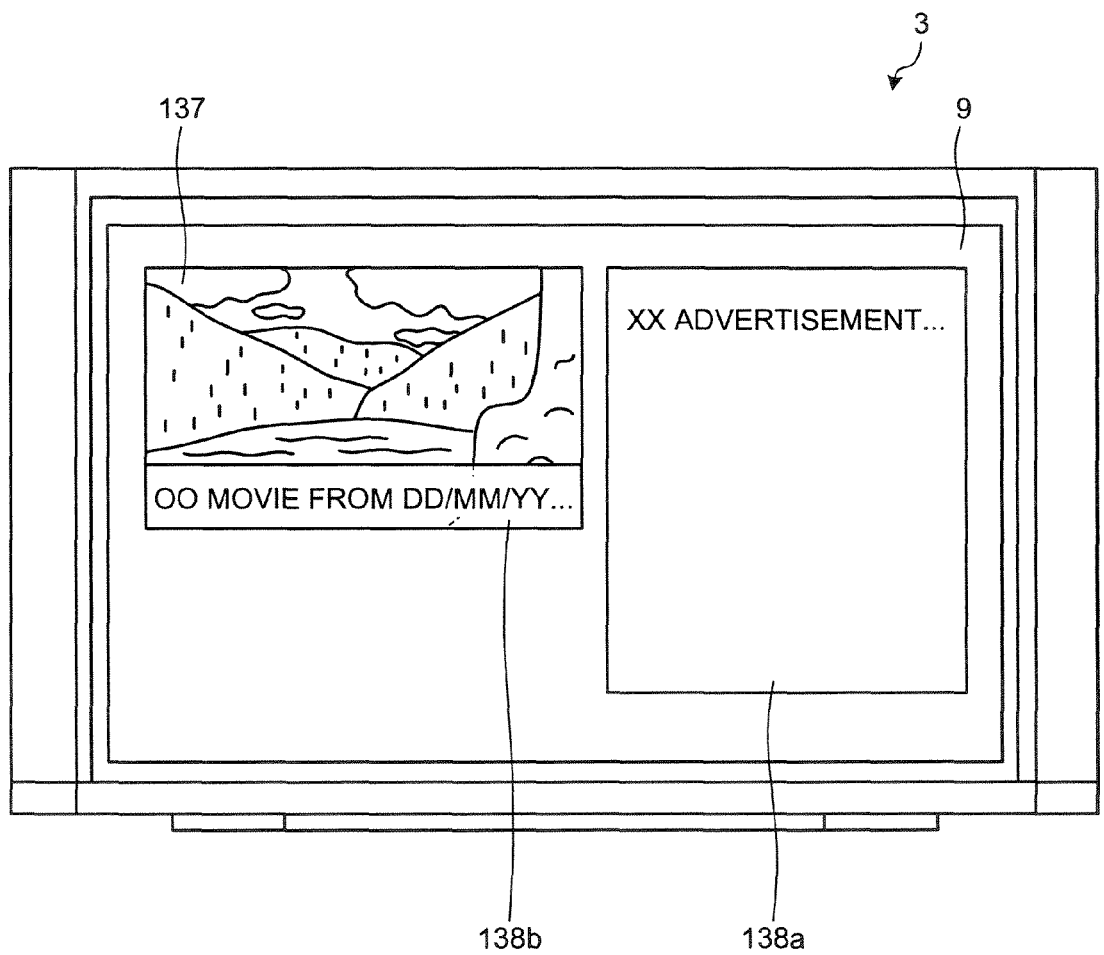
FIG. 15 is an elevational view showing an example of video and advertisement display at the monitor of the TV terminal according to a third embodiment of the present invention.

When the advertisement determined to be distributed by the recommended program/advertisement determining unit 55 is related with the distributed video program, the advertisement distribution position/timing determining unit 71 provided in the program/advertisement recommending unit 14b of the present embodiment determines the display position at the monitor 9 of the TV terminal 3 so that the advertisement is displayed in the display region 138b controlled by the information presenting unit 38b. Since the information presenting unit 38b can display the program or the advertisement information in the display region 138b which overlaps with the display region 137 controlled by the video presenting unit 37, the advertisement information can be displayed on the played video program like a caption. On the other hand, if the advertisement determined to be distributed is not related to the video program, the advertisement information is displayed in the display region 138a controlled by the information presenting unit 38a. The advertisement distribution position/timing determining unit 71 determines the display position of the advertisement on the monitor 9 of the TV terminal 3 in the above-described manner. FIG. 15 shows an example of display on the monitor 9.

The advertisement distribution position/timing determining unit 71 stores a table T1 as shown in FIG. 16. As shown in FIG. 16, the table T1 stores a recommendation ranking of the recommended advertisement, content of the advertisement, and genre of the advertisement in association with each other. The advertisement distribution position/timing determining unit 71 determines the display position of the recommended advertisement based on the genre of the recommended advertisement using the table T1 when the recommended advertisement to be distributed to the terminal with the terminal ID (XXX) is determined by the recommended program/advertisement determining unit 55. When the genre of the recommended advertisement is "program", the advertisement distribution position/timing determining unit 71 determines to display the advertisement in the display region 138b controlled by the information presenting unit 38b, whereas if the genre of the recommended advertisement is "PR", the advertisement distribution position/timing determining unit 71 determines to display the advertisement in the display region 138a controlled by the information presenting unit 38a.

FIG. 15 shows two display regions 138a and 138b on the monitor 9 of the TV terminal 3. If there is only one display region, however, the recommended advertisement is displayed in the existing display region irrespective of the genre. When the monitor 9 of the TV terminal 3 has three or more display regions 138, the advertisement distribution position/timing determining unit 71 may determine the display position based on the genre or the recommendation ranking of the advertisement. For example, when the advertisement is actually weather forecast or traffic information, it may be possible to set "Weather forecast" or "Traffic information" as a genre in Table 1 of FIG. 17. Then, the advertisement distribution position/timing determining unit 71 can determine to display such information in the display region 138a, which is located below the display region 137, i.e., the player, so that the information is more noticeable.

According to the third embodiment, the advertisement distribution position/timing determining unit 71 determines the display position, i.e., the position of distribution, of the advertisement data on the TV terminal 3 based on the genre of the advertisement data. Thus, the user can enjoy more efficient and effective information display.

Figure 19:
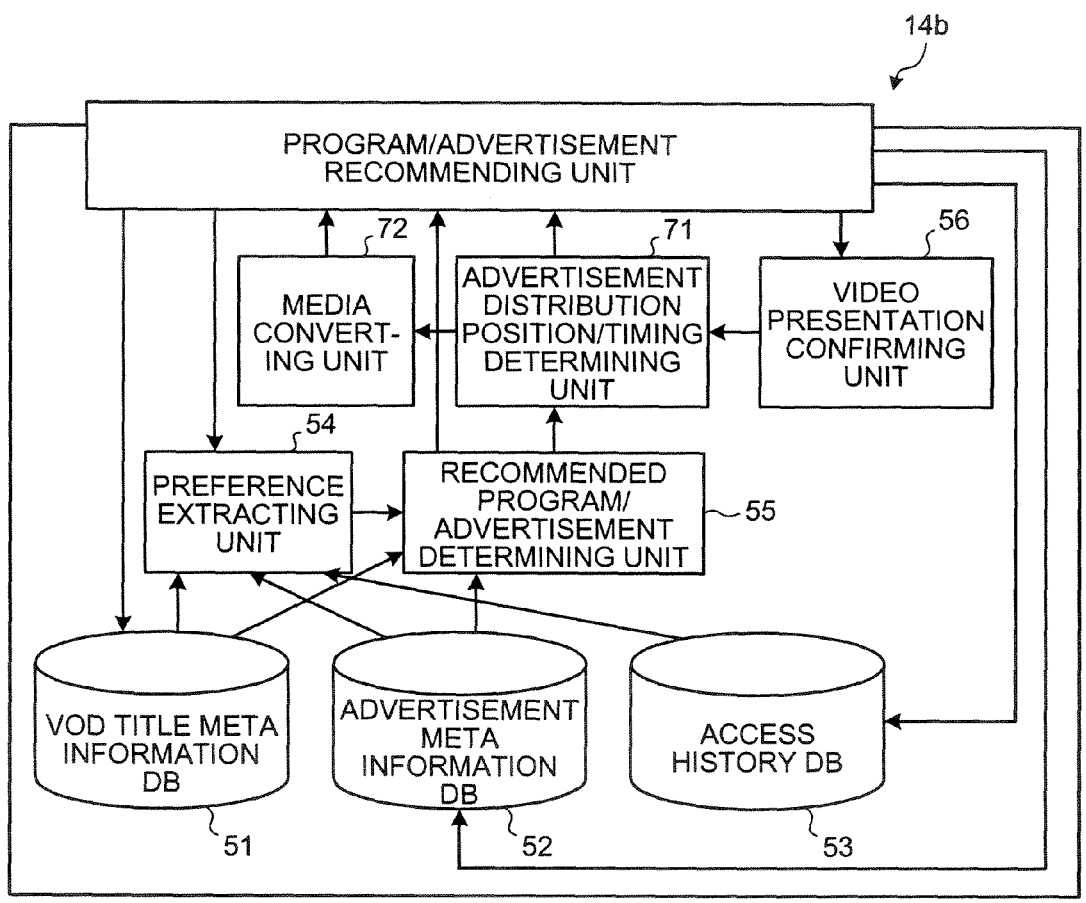
FIG. 19 is a block diagram showing an internal configuration of the program/advertisement recommending unit.

In the third embodiment, the advertisement information is presented only as the text information; however, the present invention is not limited to the present embodiment. For example, a media converting unit 72 that functions as the data converting unit can be added to the program/advertisement recommending unit 14b as shown in FIG. 19. Consequently, other than just presenting new information such as the weather forecast and the traffic information to the display region 138 at the monitor 9 of the TV terminal 3, the program/advertisement recommending unit 14b can provide the information in a form of voice via voice synthesis so as to attract attention of the user.

A fourth embodiment of the present invention is explained below with reference to FIGS. 20 to 22. Explanations for the units in the embodiment below that are the same as the first to the third embodiments will not be repeated, and the same reference characters are assigned to the same units.

Figure 18:
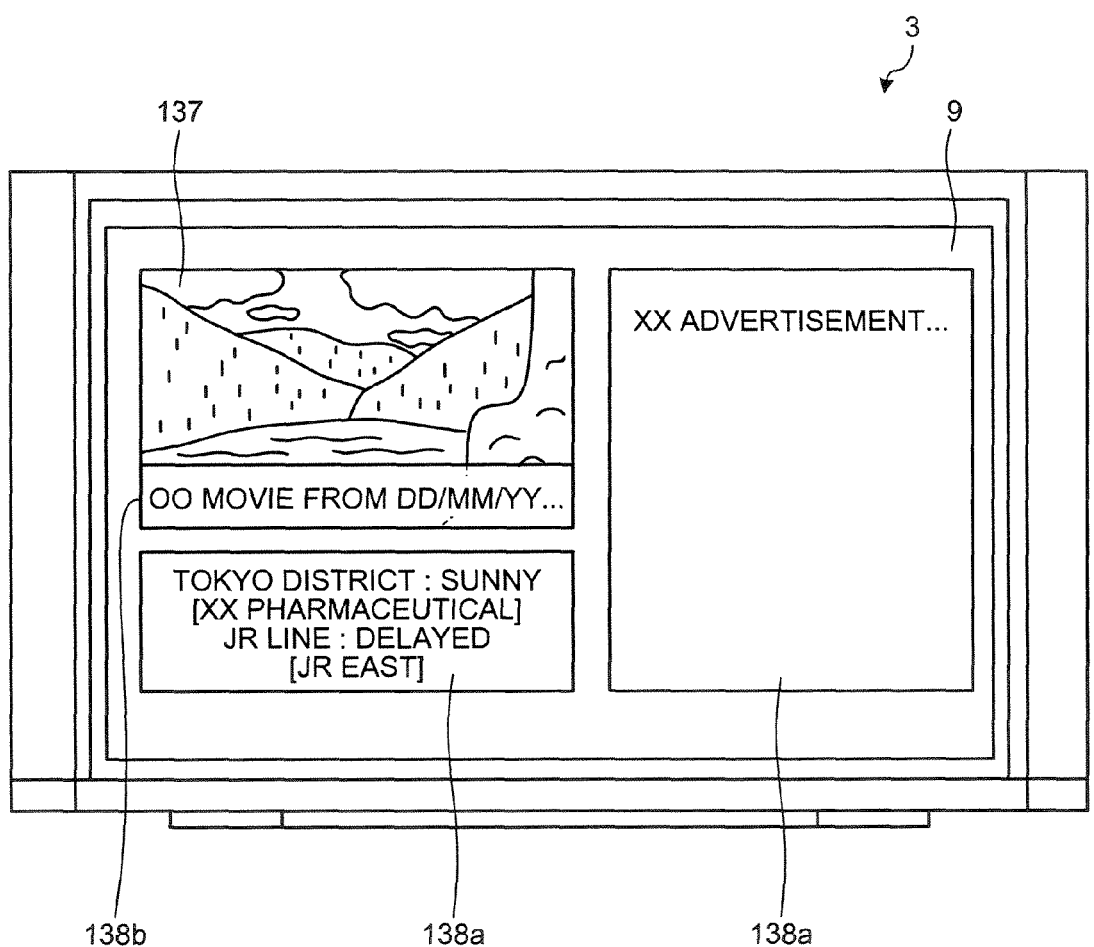
FIG. 18 is an elevational view of an example of video and advertisement display at the monitor of the TV terminal.

In the third embodiment, the position of distribution is determined based on the advertisement genre such as the program, the PR, the weather forecast, and the traffic information, and the program information is displayed in the display region 138b that overlaps with the display region 137 as shown in FIG. 18.

Figure 20:
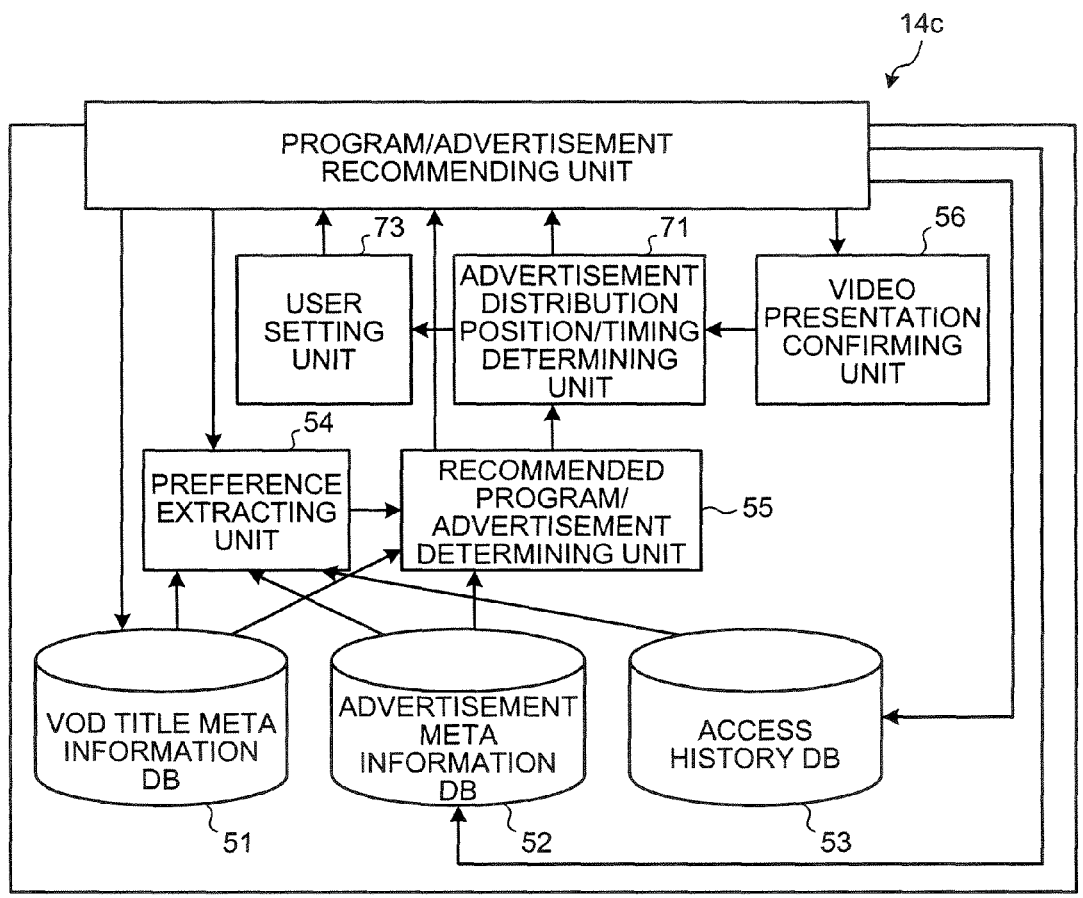
FIG. 20 is a block diagram showing an internal configuration of the program/advertisement recommending unit according to a fourth embodiment of the present invention.
Figure 21:
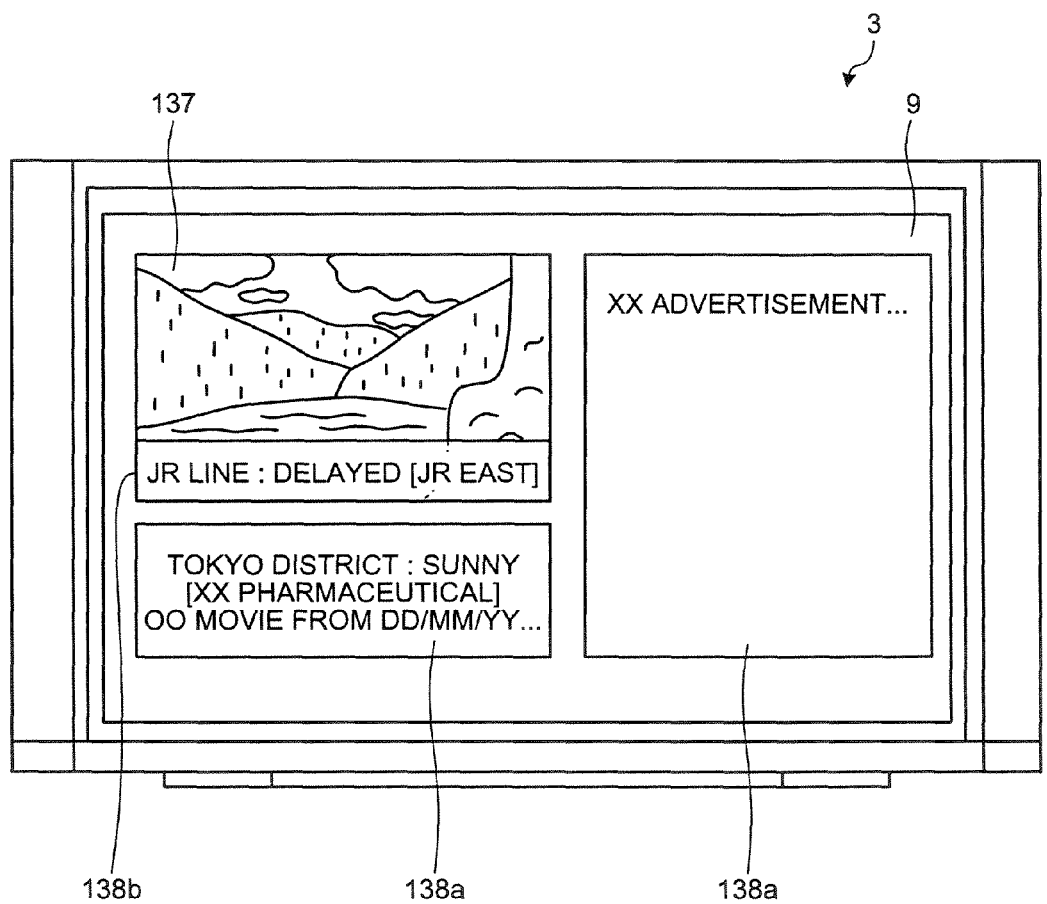
FIG. 21 is an elevational view of an example of video and advertisement display at the monitor of the TV terminal.

On the other hand, the program/advertisement recommending unit 14c of the fourth embodiment includes a user setting unit 73 as shown in FIG. 20. The user can designate which piece of information is to be displayed in which of the plural display regions 138 by using the user setting unit 73.

Specifically, the user can change the genre correspondence through the user setting unit 73 so as to display the traffic information in the display region 138b that overlaps with the display region 137, for example. Consequently, the screen configuration shown in FIG. 18 is changed to a screen configuration shown in FIG. 21.

Figure 22:
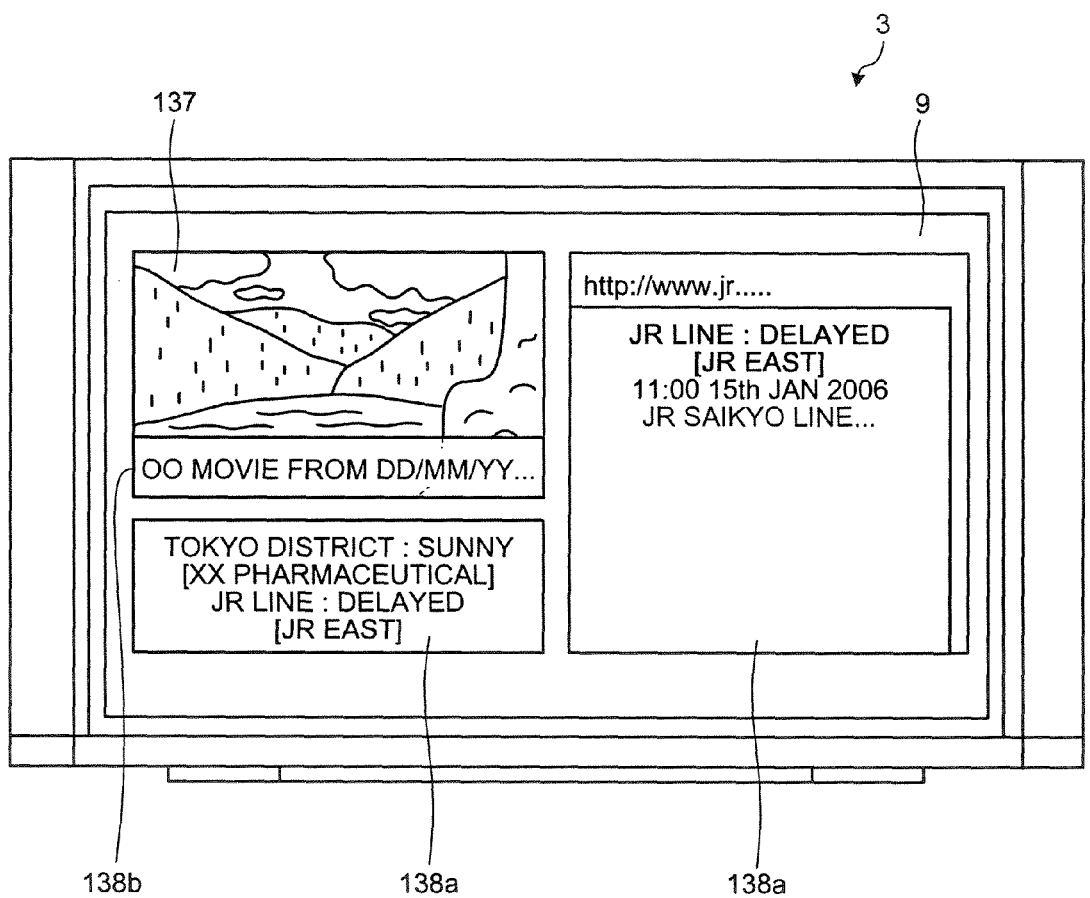
FIG. 22 is an elevational view of an example of video and advertisement display at the monitor of the TV terminal.

Further, information can be acquired instantaneously when the user configures the display region 138a as capable of displaying a Web page, since the Web page can be opened on the display region 138a by clicking a URL link presented at the display region 138a by the operating unit 7, as shown in FIG. 22. Acquiring the information instantaneously is remarkably useful for the user when, for example, the user is having a busy time in the morning.

According to the present embodiment, the user can select which piece of information is to be displayed in which of the plural display regions 138 by using the user setting unit 73 and setting the display position of the advertisement data according to the genre of advertisement data. The user setting unit 73 thus enables the setting by the user.

Figure 24:
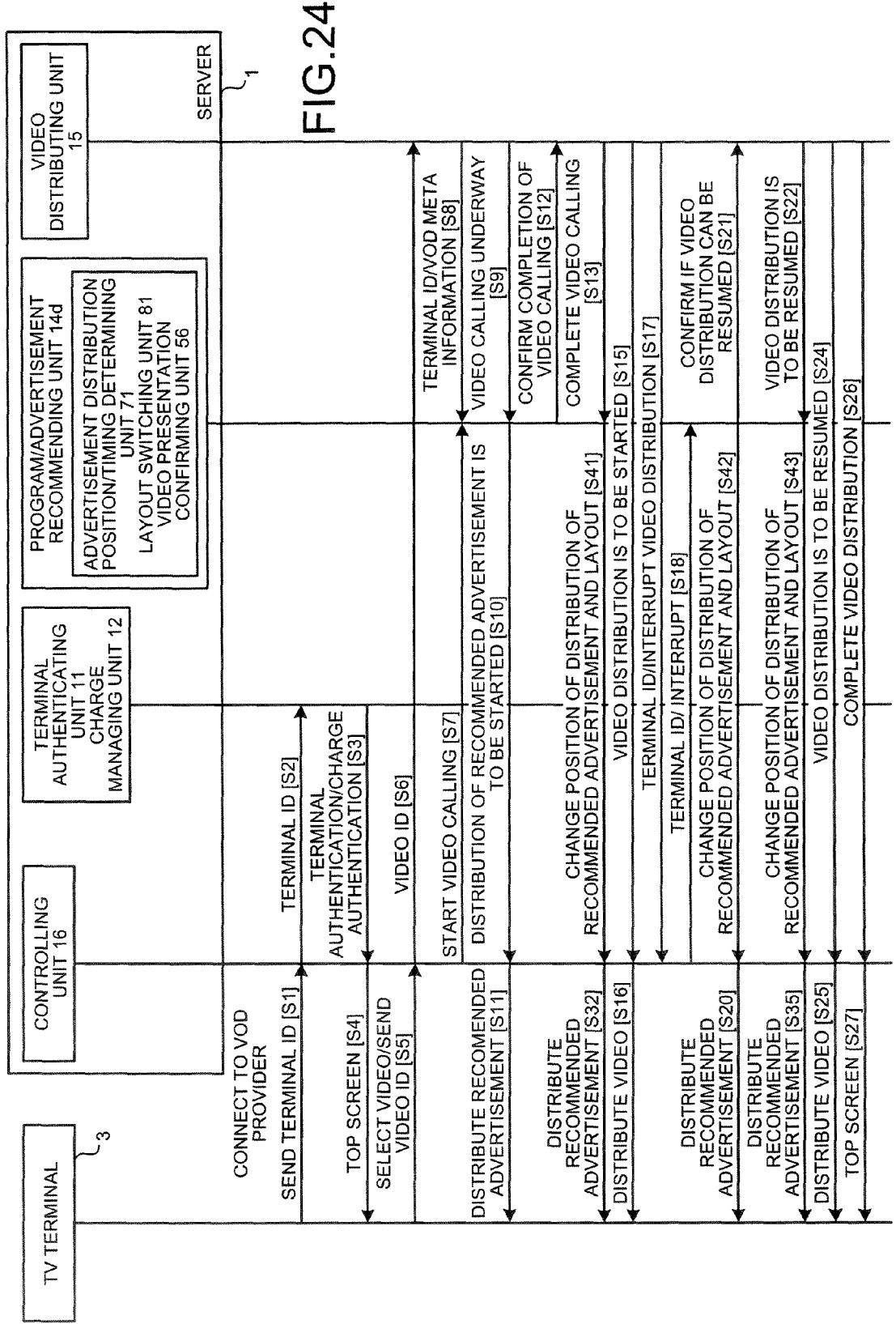
FIG. 24 is a sequence diagram showing a flow of a video distribution process.
Figure 25:
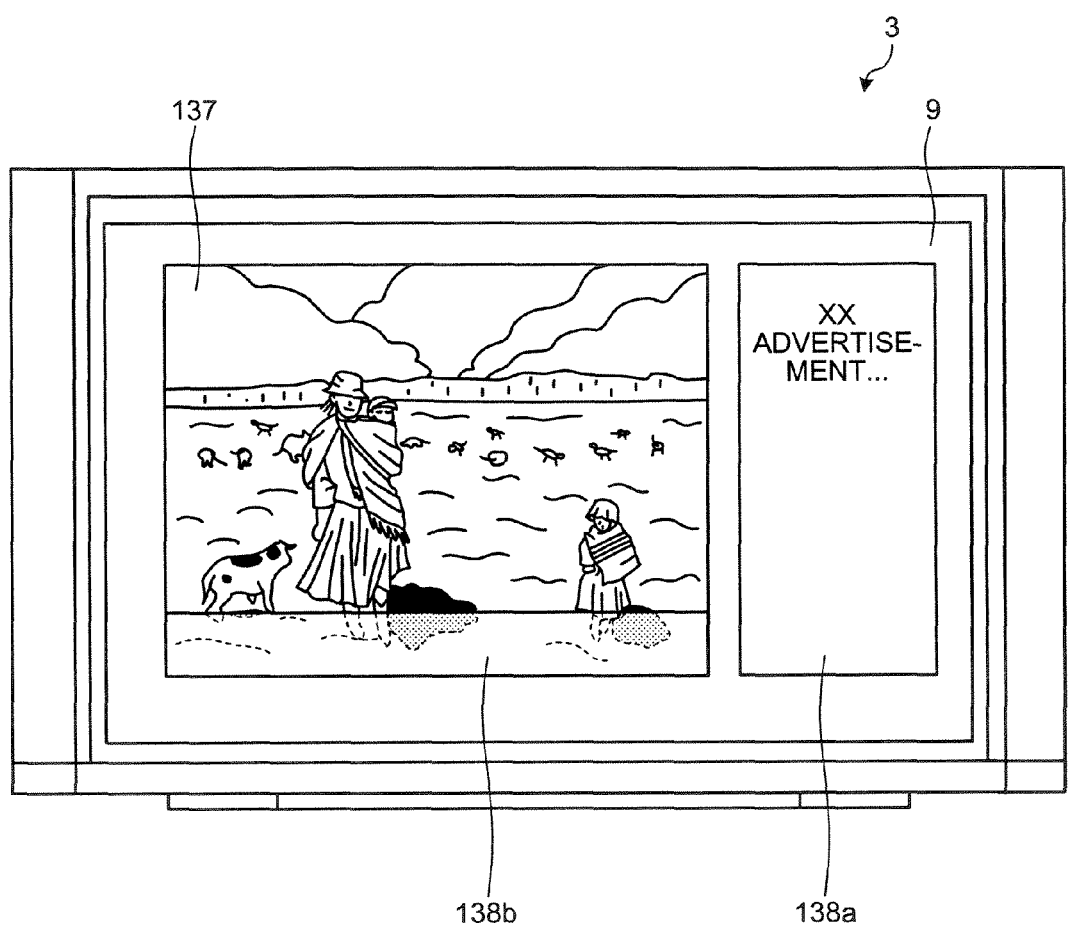
FIG. 25 is an elevational view showing an example of video and advertisement display at the monitor of the TV terminal.

A fifth embodiment of the present invention is explained with reference to FIGS. 23 to 25. Explanations for the units in the embodiment below that are the same as the first to the fourth embodiments will not be repeated, and the same reference characters are assigned to the same units.

When a movie begins to show in the movie theater, the screen size thereof gets larger and increases realistic sensation. In the present embodiment, the size of the display region 137 on the monitor 9 of the TV terminal 3 is changed in synchronization with the video distribution.

Figure 23:
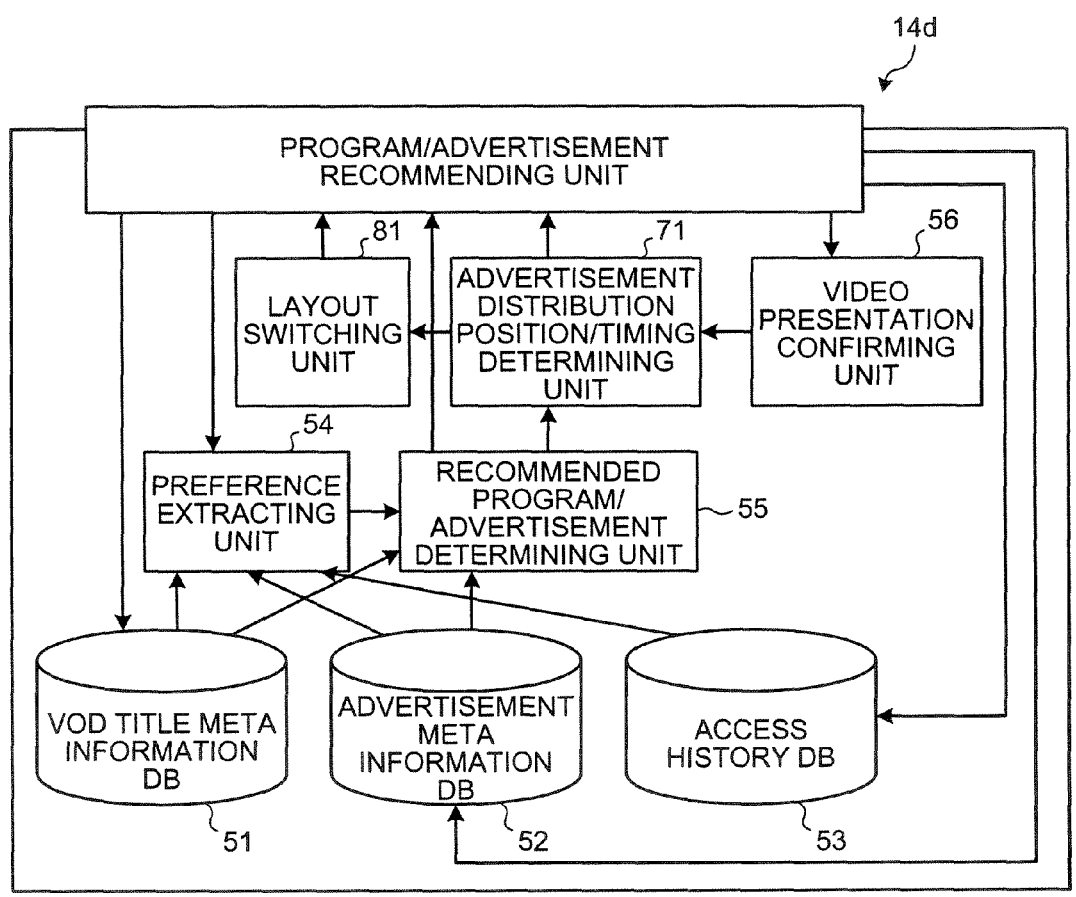
FIG. 23 is block diagram showing an internal configuration of the program/advertisement recommending unit according to a fifth embodiment of the present invention.

FIG. 23 is a block diagram showing an internal configuration of a program/advertisement recommending unit 14d according to the fifth embodiment of the present invention. As shown in FIG. 23, the program/advertisement recommending unit 14d according to the fifth embodiment of the present invention includes a layout switching unit 81 in addition to the configuration of the program/advertisement recommending unit 14a according to the second embodiment.

A video distribution process by the program/advertisement recommending unit 14d and the video distributing unit 15 is explained with reference to FIG. 24. Here, a flow of the video distribution process that is different from the flow of the video distribution process explained in FIG. 13 of the second embodiment is explained.

The advertisement distribution is not ended when the video calling is ended (step S13) in the second embodiment, and the advertisement distribution position/timing determining unit 71 of the program/advertisement recommending unit 14a that is notified that the video calling is ended changes the position of distribution of the recommended advertisement (step S31). Then, the controlling unit 16 of the server 1 distributes the recommended advertisement to the position changed in step S31 (step S32) in the second embodiment. On the other hand, in the present embodiment, when the program/advertisement recommending unit 14d is notified that the video calling is ended, the advertisement distribution position/timing determining unit 71 changes the position of distribution of the recommended advertisement, and the layout switching unit 81 changes the layout of the display region 137 and the display region 138 (step S41). As a result, the size of the display region 137 and the display region 138b are enlarged, whereas the size of the display region 138a is diminished, for example.

The steps S42 and S43 of the position and layout change replace the steps S33 and S34 that are the position change in the second embodiment.

In the fifth embodiment, the layout switching unit 81 can change the size of the region where the advertisement data is presented in the TV terminal 3, in other words, the layout switching unit 81 can change (enlarge) the size of the display region 137 in synchronization with the video distribution. Consequently, the display region 137 automatically becomes larger when the video is distributed, and the advertisement information is displayed largely when the video is not distributed. Thus, the text information can be easily viewed, and the distributed video can be enjoyed with realistic sensation.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A data distribution apparatus, comprising:
a data file configured to store video data and text data for advertisement to be provided to a receiving terminal of a Video on Demand service;
a video distributing unit configured to distribute video data in accordance with a distribution request selected by a user from the receiving terminal;
a video presentation confirming unit configured to confirm a presentation state of the video data at the receiving terminal;
an advertisement distribution determining unit configured to determine distribution of text data for advertisement to the receiving terminal when it is confirmed that the video data to be distributed by the video distributing unit is being called and when the video distribution is interrupted for some reasons; and an advertisement distributing unit configured to distribute the text data for advertisement until the video data selected by the user is displayed, wherein the advertisement distribution determining unit determines to distribute the text data for advertisement to the receiving terminal until the video presentation confirming unit confirms that calling of the video data by the video distributing unit is ended, and specifies a physical position where the text data for advertisement is displayed at the receiving terminal, and the physical position is specified in one of a first display area and a second display area based on a genre of the text data for advertisement, the first display area being a display area where the video data is displayed, the second display area being a display area other than the first display area.

2. A data distribution apparatus, comprising:

a data file configured to store video data and text data for advertisement to be provided to a receiving terminal of a Video on Demand service;

a video distributing unit configured to distribute video data in accordance with a distribution request selected by a user from the receiving terminal;

a video presentation confirming unit configured to confirm a presentation state of the video data at the receiving terminal;

an advertisement distribution determining unit configured to determine distribution of text data for advertisement to the receiving terminal when it is confirmed that the video data to be distributed by the video distributing unit is being called and when the video distribution is interrupted for some reasons; and an advertisement distributing unit configured to distribute the text data for advertisement until the video data selected by the user is displayed, wherein the advertisement distribution determining unit determines to distribute the text data for advertisement to the receiving terminal, and changes a physical position between a first display area and a second display area based on whether the calling of the video data is ended, the physical position being a position where the text data for advertisement is displayed at the receiving terminal, the first display area being a display area where the video data is displayed, the second display area being a display area other than the first display area.

3. A data distribution apparatus, comprising:

a data file configured to store video data and text data for advertisement to be provided to a receiving terminal of a Video on Demand service;

a video distributing unit configured to distribute video data in accordance with a distribution request selected by a user from the receiving terminal;

a video presentation confirming unit configured to confirm a presentation state of the video data at the receiving terminal;

an advertisement distribution determining unit configured to determine distribution of text data for advertisement to the receiving terminal when it is confirmed that the video data to be distributed by the video distributing unit is being called and when the video distribution is interrupted for some reasons; and an advertisement distributing unit configured to distribute the text data for advertisement until the video data selected by the user is displayed, wherein the advertisement distribution determining unit determines to distribute the text data for advertisement to the receiving terminal, and changes a size of an area on a physical position where the text data for advertisement is displayed at the receiving terminal, based on whether the calling of the video data is ended; and the advertisement distribution determining unit upsizes the area on the physical position before the calling of the video data is ended and downsizes the area on the physical position after the calling of the video data is ended.

4. A computer program product having a non-transitory computer readable medium including programmed instructions, wherein the instructions, when executed by a computer, cause the computer to perform:

distributing video data in accordance with a distribution request selected by a user from a receiving terminal, the video data being stored in a data file which stores video data and text data for advertisement to be provided to the receiving terminal of a Video on Demand service;

confirming a presentation state of the video data at the receiving terminal;

determining distribution of text data for advertisement to the receiving terminal when it is confirmed that the video data is being called and when the video distribution is interrupted for some reasons;

distributing the text data for advertisement until the video data selected by the user is displayed; and changing a physical position between a first display area and a second display area, or a size of an area on a physical position based on whether calling of the video data is ended, the physical position being a position where the text data for advertisement are displayed at the receiving terminal, wherein the area on the physical position is upsized before the calling of the video data is ended and the area on the physical position is downsized after the calling of the video data is ended.

5. A method of data distribution comprising:

distributing video data in accordance with a distribution request selected by a user from a receiving terminal, the video data being stored in a data file which stores video data and text data for advertisement to be provided to the receiving terminal of a Video on Demand service;

confirming a presentation state of the video data at the receiving terminal;

determining a distribution of text data for advertisement to the receiving terminal when it is confirmed that the video data is being called and when the video distribution is interrupted for some reasons;

distributing the text data for advertisement until the video data selected by the user is displayed; and changing a physical position between a first display area and a second display area, or a size of an area on a physical position, based on whether calling of the video data is ended, the physical position being a position where the text data for advertisement are displayed at the receiving terminal; and the advertisement distribution determining unit upsizes the area on the physical position before the calling of the video data is ended and downsizes the area on the physical position after the calling of the video data is ended.

6. The data distribution apparatus according to claim 1, wherein
the advertisement distribution determining unit specifies the physical position in the first display area such that the test data overlaps with the video data when the genre is related to a video program of the video data and specifies the physical position in the second display area when the genre is not related to the video program.

7. The data distribution apparatus according to claim 2, wherein
the advertisement distribution determining unit specifies the physical position in the second display area before the calling of the video data is ended and specifies the physical position in the first display area after the calling of the video data is ended.

* * * * *